(12) United States Patent
Ikeda et al.

(10) Patent No.: US 11,556,033 B2
(45) Date of Patent: Jan. 17, 2023

(54) DISPLAY DEVICE

(71) Applicant: Japan Display Inc., Tokyo (JP)

(72) Inventors: Kojiro Ikeda, Tokyo (JP); Tenfu Nakamura, Tokyo (JP); Kentaro Okuyama, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/467,904

(22) Filed: Sep. 7, 2021

(65) Prior Publication Data

US 2021/0397051 A1 Dec. 23, 2021

Related U.S. Application Data

(63) Continuation of application No. PCT/JP2020/006510, filed on Feb. 19, 2020.

(30) Foreign Application Priority Data

Mar. 7, 2019 (JP) .............................. JP2019-041735

(51) Int. Cl.
*G02F 1/1343* (2006.01)
*G02F 1/1334* (2006.01)

(52) U.S. Cl.
CPC ...... *G02F 1/134309* (2013.01); *G02F 1/1334* (2013.01); *G02F 1/134318* (2021.01)

(58) Field of Classification Search
None
See application file for complete search history.

(56) References Cited

U.S. PATENT DOCUMENTS

| | | | |
|---|---|---|---|
| 11,061,290 B1 * | 7/2021 | Tang | G02F 1/139 |
| 2002/0054251 A1 | 5/2002 | Maruyama et al. | |
| 2011/0249221 A1 | 10/2011 | Uchida et al. | |
| 2013/0308067 A1 * | 11/2013 | Hashimoto | G02B 30/31 349/15 |

(Continued)

FOREIGN PATENT DOCUMENTS

| | | | |
|---|---|---|---|
| JP | 2003-107438 A | 4/2003 | |
| JP | 2012-151081 A | 8/2012 | |

(Continued)

OTHER PUBLICATIONS

International Search Report dated Apr. 14, 2020 in PCT/JP2020/006510, filed on Feb. 19, 2020 citing documents AC, AQ-AR therein, 3 pages.

(Continued)

*Primary Examiner* — Ryan Crockett
(74) *Attorney, Agent, or Firm* — Maier & Maier, PLLC

(57) ABSTRACT

According to one embodiment, a display device includes a first substrate having a first transparent substrate and a pixel electrode, a second substrate having a second transparent substrate, a first common electrode, a second common electrode, and an insulating film disposed between the first common electrode and the second common electrode, and a liquid crystal layer. The first common electrode is disposed between the liquid crystal layer and the insulating film, and includes a first opening and a first electrode portion. The second common electrode is disposed between the insulating film and the second transparent substrate, and includes a second electrode portion overlapping the first opening.

14 Claims, 17 Drawing Sheets

(56) References Cited

U.S. PATENT DOCUMENTS

| | | | |
|---|---|---|---|
| 2014/0104545 A1* | 4/2014 | Miyazawa | G02B 30/27 349/96 |
| 2014/0192298 A1* | 7/2014 | Sumiyoshi | G02B 30/27 349/138 |
| 2015/0009439 A1* | 1/2015 | Morita | G02F 1/134363 349/42 |
| 2015/0055055 A1 | 2/2015 | Ebisui et al. | |
| 2015/0268521 A1* | 9/2015 | Daishi | H01L 27/1222 349/138 |
| 2016/0216576 A1* | 7/2016 | Miyazaki | G02F 1/1368 |
| 2021/0349359 A1* | 11/2021 | Zhao | G02F 1/133345 |
| 2021/0397051 A1* | 12/2021 | Ikeda | G02F 1/1334 |

FOREIGN PATENT DOCUMENTS

| | | |
|---|---|---|
| JP | 2013-257522 A | 12/2013 |
| WO | WO 2013/168639 A1 | 11/2013 |

OTHER PUBLICATIONS

Office Action dated Sep. 13, 2022 in corresponding Japanese Application No. 2019-041735, 6 pages.

* cited by examiner

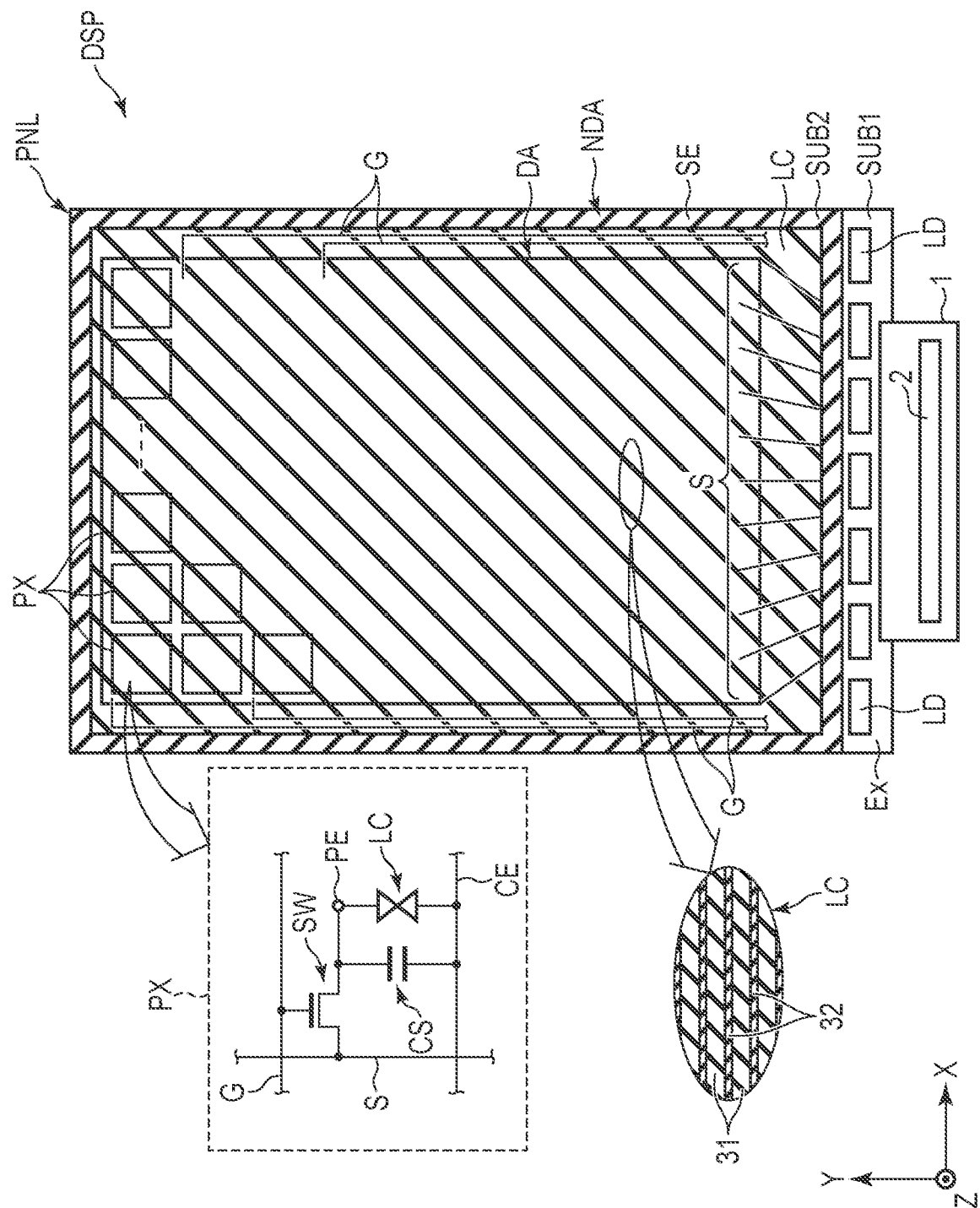
F I G. 1

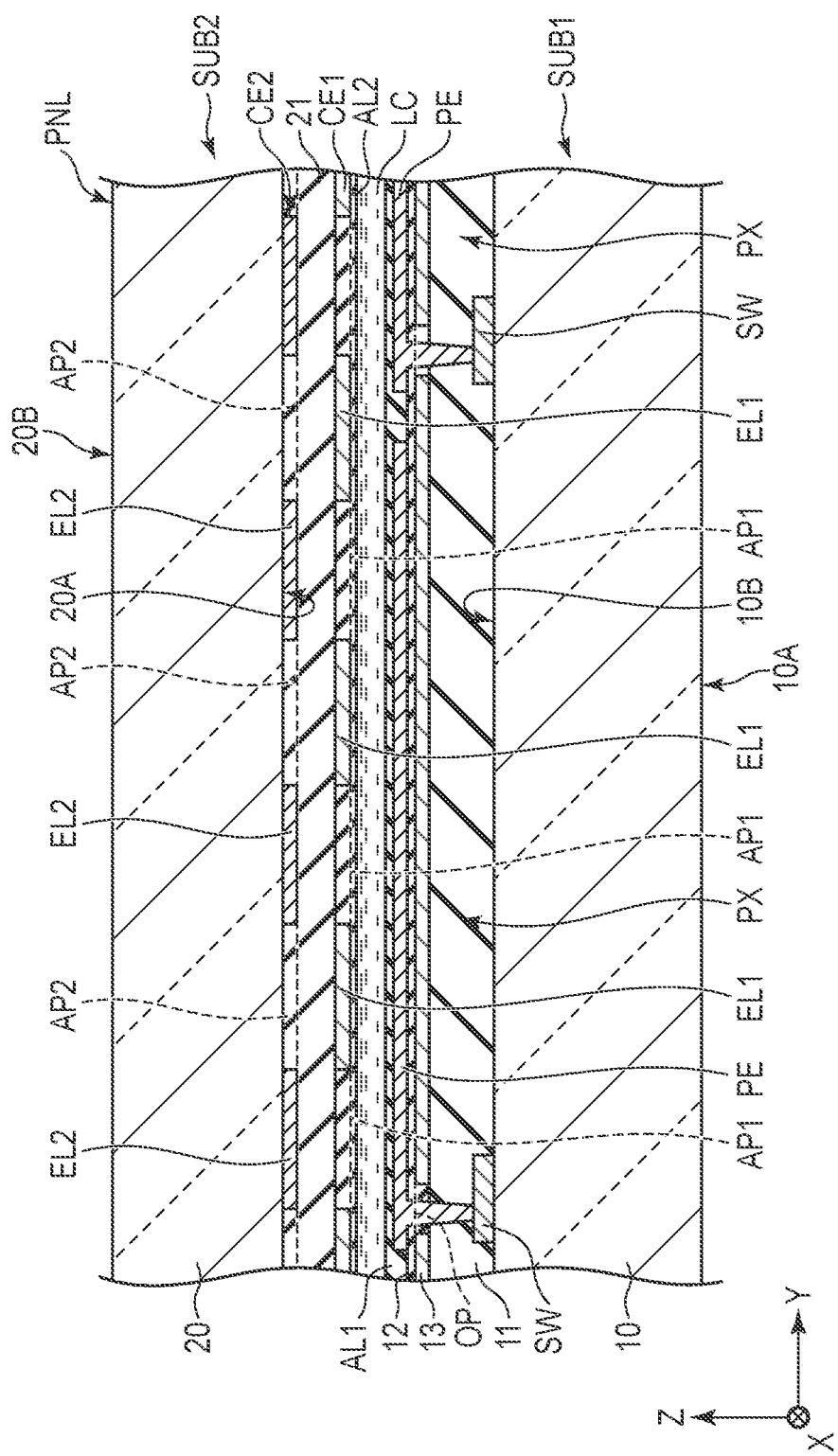
F I G. 2

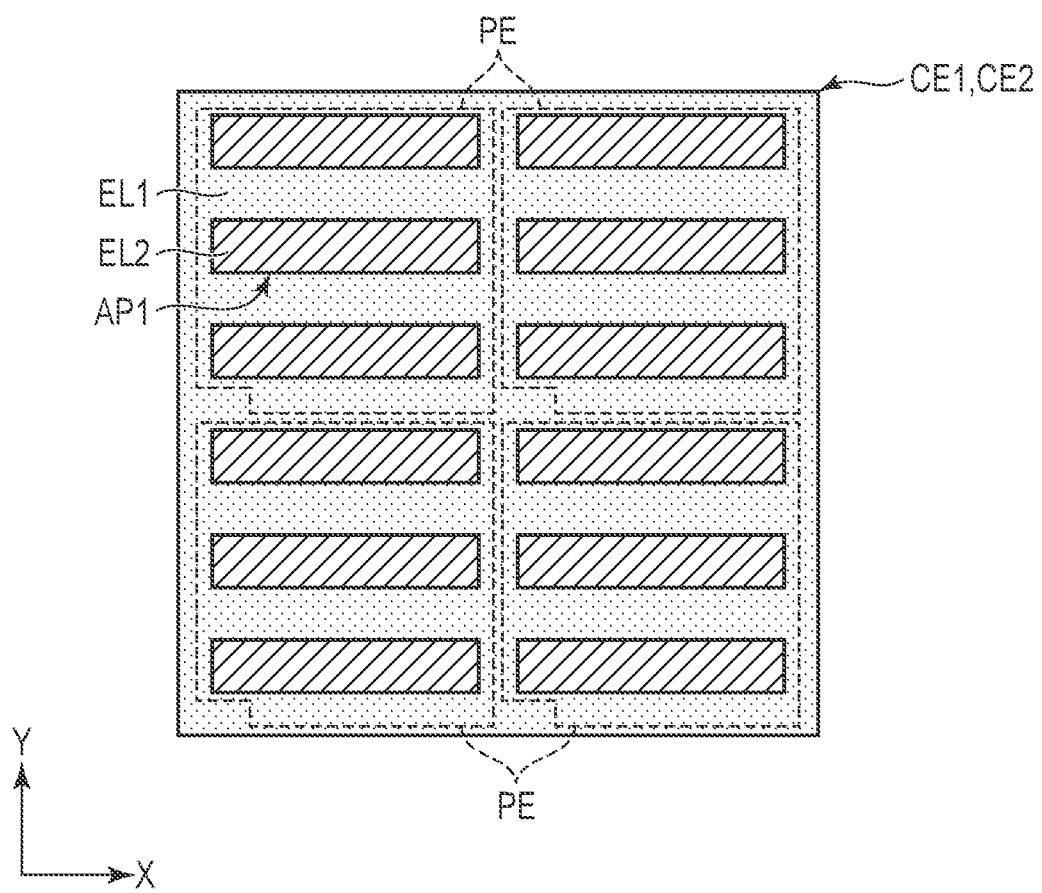
F I G. 5

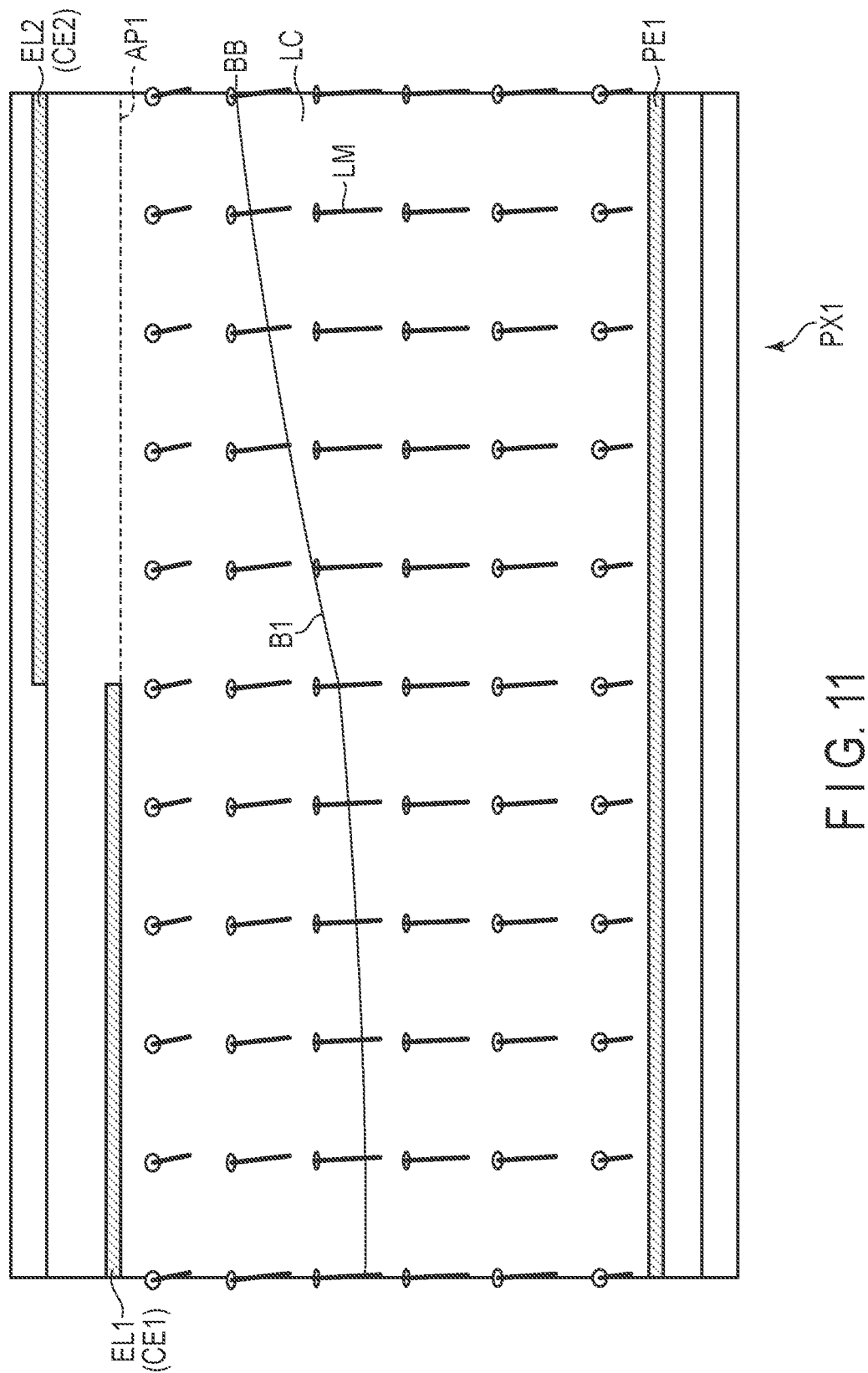
F I G. 11

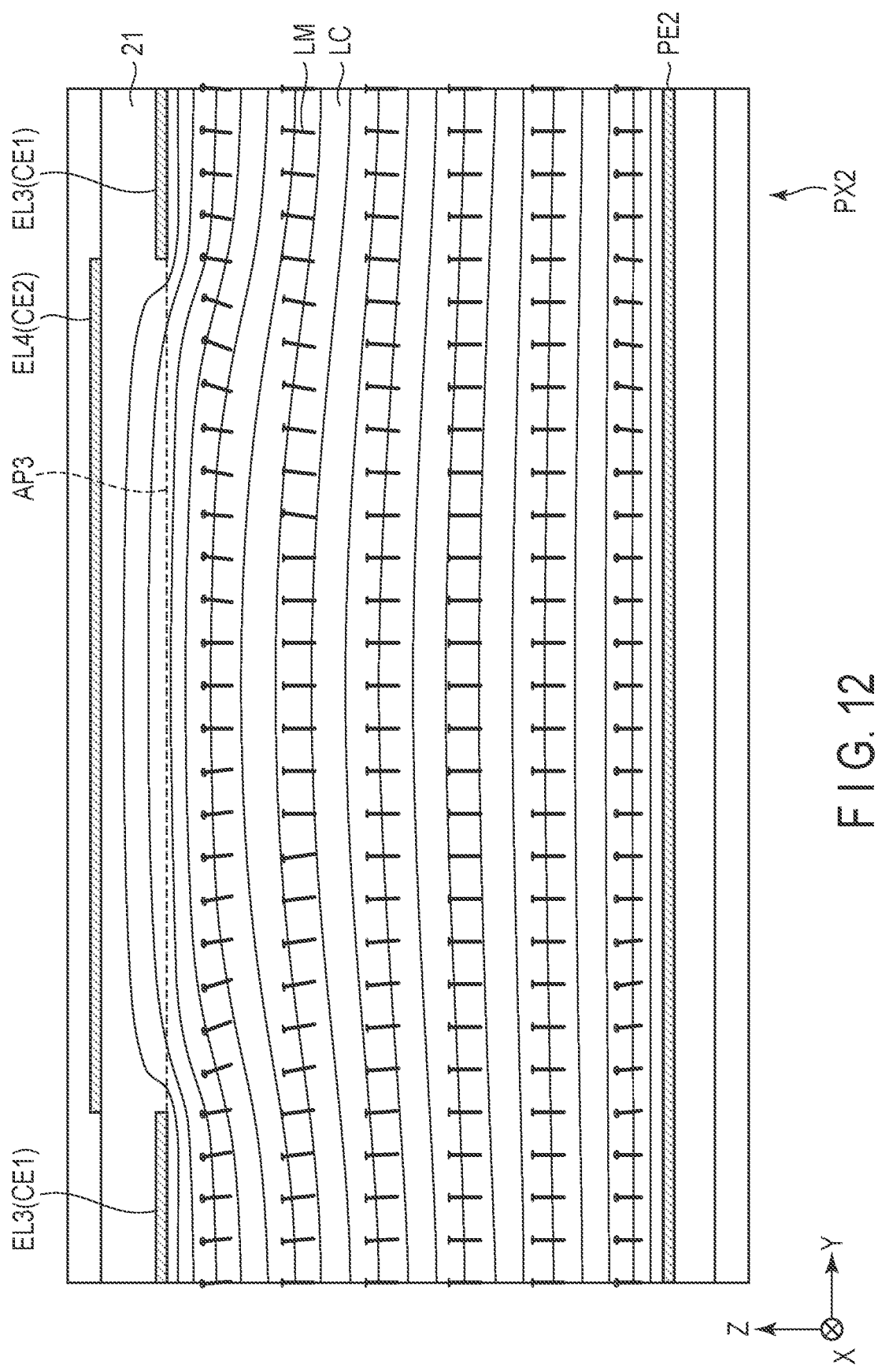
F I G. 12

DISPLAY DEVICE

CROSS-REFERENCE TO RELATED APPLICATION

This application is a Continuation Application of PCT Application No. PCT/JP2020/006510, filed Feb. 19, 2020 and based upon and claiming the benefit of priority from Japanese Patent Application No. 2019-041735, filed Mar. 7, 2019, the entire contents of all of which are incorporated herein by reference.

FIELD

Embodiments described herein relate generally to a display device.

BACKGROUND

In recent years, various illumination devices including a light modulation element exhibiting scattering property or transparency to light have been proposed. In one example, the light modulation element includes a polymer dispersed liquid crystal layer as the light modulation layer. The light modulation element is disposed behind a light guide and scatters light incident from a side surface of the light guide.

BRIEF DESCRIPTION OF THE DRAWINGS

FIG. 1 is a plan view illustrating a configuration example of a display device DSP of the present embodiment.

FIG. 2 is a cross-sectional view illustrating a first configuration example of a display panel PNL illustrated in FIG. 1.

FIG. 5 is a plan view illustrating a state in which the first common electrode CE1 and the second common electrode CE2 illustrated in FIGS. 4A and 4B overlap.

FIG. 11 is a schematic diagram illustrating a luminance distribution and an alignment state of the liquid crystal molecules in the pixel PX1 illustrated in FIG. 9.

FIG. 12 is a schematic diagram illustrating an electric field distribution and an alignment state of the liquid crystal molecules in the pixel PX2.

DETAILED DESCRIPTION

Figure 3:
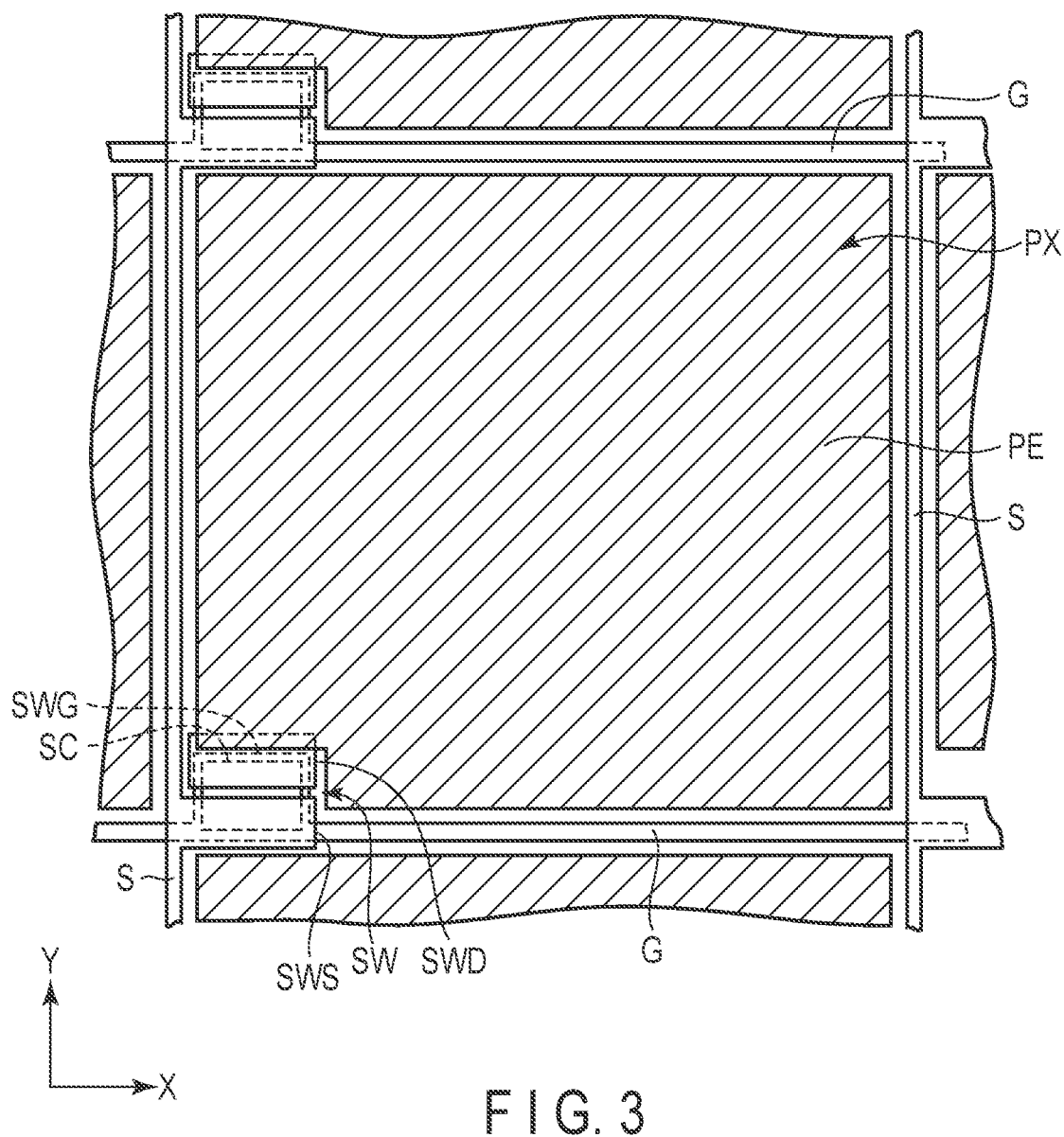
FIG. 3 is a plan view illustrating an example of a pixel PX illustrated in FIG. 2.

In general, according to one embodiment, there is provided a display device including: a first substrate including a first transparent substrate, a switching element, and a pixel electrode electrically connected to the switching element; a second substrate including a second transparent substrate, a first common electrode, a second common electrode having the same electric potential as the first common electrode, and an insulating film disposed between the first common electrode and the second common electrode; and a liquid crystal layer that is disposed between the first substrate and the second substrate, and contains polymers and liquid crystal molecules, wherein the first common electrode is disposed between the liquid crystal layer and the insulating film, and includes a first opening and a first electrode portion, and the second common electrode is disposed between the insulating film and the second transparent substrate, and includes a second electrode portion overlapping the first opening.

According to the present embodiment, there is provided a display device including: a first substrate including a first transparent substrate, a switching element, a first pixel electrode and a second pixel electrode electrically connected to the switching element, and an insulating film disposed between the first pixel electrode and the second pixel electrode; a second substrate including a second transparent substrate, and a common electrode, and a liquid crystal layer that is disposed between the first substrate and the second substrate, and contains polymers and liquid crystal molecules, wherein the first pixel electrode is disposed between the insulating film and the liquid crystal layer, and includes a first opening and a first electrode portion, and the second pixel electrode is disposed between the first transparent substrate and the insulating film, and includes a second electrode portion overlapping the first opening.

According to the present embodiment, there is provided a display device including: a first substrate; a second substrate; a liquid crystal layer that is disposed between the first substrate and the second substrate, and contains polymers and liquid crystal molecules, and a light emitting element facing a side surface of the second substrate, wherein the first substrate or the second substrate includes a transparent substrate, a first transparent electrode, a second transparent electrode having the same electric potential as the first transparent electrode, and an insulating film disposed between the first transparent electrode and the second transparent electrode, each of the first transparent electrode and the second transparent electrode includes a plurality of openings, the openings of the first transparent electrode and the openings of the second transparent electrode do not overlap each other, and the first transparent electrode includes a first opening and a third opening, and the first opening is disposed between the light emitting element and the third opening, and has a width larger than the third opening.

FIG. 1 is a plan view illustrating a configuration example of a display device DSP of the present embodiment. In one example, a first direction X, a second direction Y, and a third direction Z are orthogonal to each other, but may intersect at an angle other than 90 degrees. The first direction X and the second direction Y correspond to a direction parallel to a main surface of a substrate constituting the display device DSP, and the third direction Z corresponds to a thickness direction of the display device DSP. It is assumed that there is an observation position where the display device DSP is observed on a distal end side of an arrow indicating the third direction Z, and a view from this observation position toward an X-Y plane defined by the first direction X and the second direction Y is referred to as a plan view.

In the present embodiment, a liquid crystal display device to which a polymer dispersed liquid crystal is applied will be described as an example of the display device DSP. The display device DSP includes a display panel PNL, a wiring board 1, an IC chip 2, and light emitting elements LD.

The display panel PNL includes a first substrate SUB1, a second substrate SUB2, a liquid crystal layer LC, and a sealant SE. The first substrate SUB1 and the second substrate SUB2 are formed in a flat plate shape parallel to the X-Y plane. The first substrate SUB1 and the second substrate SUB2 overlap each other in plan view. The first substrate SUB1 and the second substrate SUB2 are bonded by the sealant SE. The liquid crystal layer LC is held between the first substrate SUB1 and the second substrate SUB2, and is sealed by the sealant SE. In FIG. 1, the liquid crystal layer LC and the sealant SE are indicated by different oblique lines.

As schematically illustrated in an enlarged manner in FIG. 1, the liquid crystal layer LC includes a polymer-dispersed liquid crystal containing polymers 31 and liquid crystal molecules 32. In one example, the polymers 31 are liquid-crystal polymers. The polymers 31 are formed in a streak shape extending along the first direction X. The liquid crystal molecules 32 are dispersed in gaps between the polymers 31, and are aligned such that long axes are along the first direction X. Each of the polymers 31 and the liquid crystal molecules 32 has optical anisotropy or refractive index anisotropy. The responsiveness of the polymers 31 to an electric field is lower than the responsiveness of the liquid crystal molecules 32 to the electric field.

In one example, an alignment direction of the polymers 31 hardly changes regardless of the presence or absence of the electric field. On the other hand, an alignment direction of the liquid crystal molecules 32 changes according to the electric field in a state in which a high voltage equal to or higher than a threshold value is applied to the liquid crystal layer LC. In the state in which the voltage is not applied to the liquid crystal layer LC, optical axes of the polymers 31 and the liquid crystal molecules 32 are parallel to each other, and light incident on the liquid crystal layer LC is transmitted without being almost scattered in the liquid crystal layer LC (transparent state). In the state in which the voltage is applied to the liquid crystal layer LC, the optical axes of the polymers 31 and the liquid crystal molecules 32 intersect each other, and the light incident on the liquid crystal layer LC is scattered in the liquid crystal layer LC (scattering state).

The display panel PNL includes a display area DA in which an image is displayed, and a frame-shaped non-display area NDA that surrounds the display area DA. The sealant SE is disposed in the non-display area NDA. The display area DA includes pixels PX arranged in a matrix in the first direction X and the second direction Y.

As illustrated in an enlarged manner in FIG. 1, each pixel PX includes a switching element SW, a pixel electrode PE, a common electrode CE, a liquid crystal layer LC, and the like. The switching element SW includes, for example, a thin film transistor (TFT), and is electrically connected to scanning lines G and signal lines S.

The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The common electrode CE is provided in common for the plurality of pixel electrodes PE. Each of the pixel electrodes PE faces the common electrode CE in the third direction Z. The liquid crystal layer LC (in particular, liquid crystal molecules 32) is driven by an electric field generated between the pixel electrode PE and the common electrode CE. A capacitance CS is formed, for example, between an electrode having the same electric potential as the common electrode CE and an electrode having the same electric potential as the pixel electrode PE.

As will be described later, the scanning line G, the signal line S, the switching element SW, and the pixel electrode PE are provided on the first substrate SUB1, and the common electrode CE is provided on the second substrate SUB2. In the first substrate SUB1, the scanning line G and the signal line S are electrically connected to the wiring board 1 or the IC chip 2.

The wiring board 1 is electrically connected to an extension portion Ex of the first substrate SUB1. The wiring board 1 is a bendable flexible printed circuit board. The IC chip 2 is electrically connected to the wiring board 1. The IC chip 2 incorporates, for example, a display driver that outputs a signal necessary for image display. The IC chip 2 may be electrically connected to the extension portion Ex.

The light emitting elements LD overlap the extension portion Ex in plan view. The plurality of light emitting elements LD is arranged at intervals along the first direction X.

First Configuration Example

FIG. 2 is a cross-sectional view illustrating a first configuration example of the display panel PNL illustrated in FIG. 1. The liquid crystal layer LC is provided between the first substrate SUB1 and the second substrate SUB2.

The first substrate SUB1 includes a first transparent substrate 10, insulating films 11 and 12, a capacitance electrode 13, switching elements SW, a pixel electrode PE, and an alignment film AL1. The first transparent substrate 10 includes a main surface (lower surface) 10A and a main surface (upper surface) 10B opposite to the main surface 10A. The switching elements SW are arranged on the main surface 10B side. The insulating film 11 covers the switching elements SW. The scanning lines G and the signal lines S illustrated in FIG. 1 are arranged between the first transparent substrate 10 and the insulating film 11, but are not illustrated here. The capacitance electrode 13 is disposed between the insulating films 11 and 12. The pixel electrode PE is disposed for each pixel PX between the insulating film 12 and the alignment film AL1. The pixel electrode PE is electrically connected to the switching element SW via an opening OP of the capacitance electrode 13. The pixel electrode PE overlaps the capacitance electrode 13 with the insulating film 12 interposed therebetween to form the capacitance CS of the pixel PX. The alignment film AL1 covers the pixel electrode PE. The alignment film AL1 is in contact with the liquid crystal layer LC.

The second substrate SUB2 includes a second transparent substrate 20, a first common electrode CE1, a second common electrode CE2, an insulating film 21, and an alignment film AL2. The second transparent substrate 20 includes a main surface (lower surface) 20A and a main surface (upper surface) 20B opposite to the main surface 20A. The main surface 20A of the second transparent substrate 20 faces the main surface 10B of the first transparent substrate 10. The second substrate SUB2 may include a light shielding layer immediately above the scanning lines G, the signal lines S, and the switching elements SW.

The insulating film 21 is provided between the first common electrode CE1 and the second common electrode CE2. In one example, the insulating film 21 is a transparent organic insulating film, but may be an inorganic insulating film. The first common electrode CE1 and the second common electrode CE2 are arranged over the plurality of pixels PX, and face the plurality of pixel electrodes PE in the third direction Z.

The first common electrode CE1 is provided between the liquid crystal layer LC and the insulating film 21. The first common electrode CE1 includes first openings AP1 and first electrode portions EL1 that define the first openings AP1. In other words, a region of the first common electrode CE1 that is not the first opening AP1 is referred to as the first electrode portion EL1. The alignment film AL2 covers the first common electrode CE1. The alignment film AL2 is in contact with the insulating film 21 in the first openings AP1. The alignment film AL2 is in contact with the liquid crystal layer LC.

The second common electrode CE2 has the same electric potential as the first common electrode CE1, and the first and second common electrodes are electrically connected to each other in the non-display area NDA as will be described later. The first common electrode CE1 and the second common electrode CE2 are electrically connected to the capacitance electrode 13, and have the same electric potential as the capacitance electrode 13. The second common electrode CE2 is provided between the insulating film 21 and the second transparent substrate 20. The second common electrode CE2 includes second electrode portions EL2 overlapping the first openings AP1. In the example illustrated in FIG. 2, the second common electrode CE2 includes second openings AP2 defined by the second electrode portions EL2. A region of the second common electrode CE2 that is not the second opening AP2 is referred to as the second electrode portion EL2. The insulating film 21 is in contact with the second transparent substrate 20 at the second openings AP2. The first electrode portion EL1 overlaps the second opening AP2.

In the third direction Z, the pixel electrode PE faces the first electrode portion EL1, and in the first opening AP1, faces the second electrode portion EL2.

The first transparent substrate 10 and the second transparent substrate 20 are insulating substrates such as a glass substrate and a plastic substrate. The insulating film 11 is made of a transparent insulating material such as a silicon oxide, a silicon nitride, a silicon oxynitride, or an acrylic resin. In one example, the insulating film 11 includes an inorganic insulating film and an organic insulating film. The insulating film 12 is an inorganic insulating film such as a silicon nitride. The capacitance electrode 13, the pixel electrode PE, the first common electrode CE1, and the second common electrode CE2 are transparent electrodes made of a transparent conductive material such as an indium tin oxide (ITO) or an indium zinc oxide (IZO). An alignment treatment is performed on the alignment films AL1 and AL2 along, for example, the first direction X. The alignment treatment may be a rubbing treatment or a photo-alignment treatment.

FIG. 3 is a plan view illustrating an example of the pixel PX illustrated in FIG. 2. The scanning lines G extend in the first direction X, and the signal lines S extend in the second direction Y. The switching element SW is provided at an intersection of the scanning line G and the signal line S. The switching element SW includes a semiconductor layer SC. The semiconductor layer SC overlaps a gate electrode SWG integrated with the scanning line G. A source electrode SWS integrated with the signal line S and a drain electrode SWD are electrically connected to the semiconductor layer SC. The pixel electrode PE is provided between the adjacent scanning lines G and between the adjacent signal lines S. The pixel electrode PE overlaps the drain electrode SWD and is electrically connected to the switching element SW.

Figure 4A:
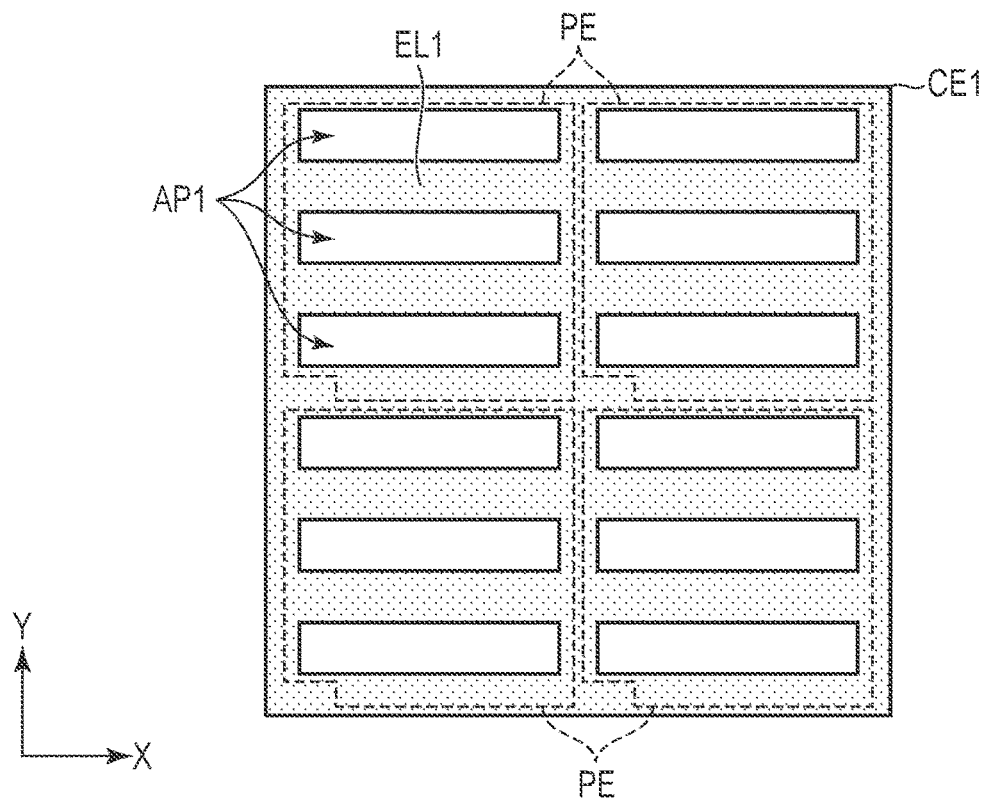
FIG. 4A is a plan view illustrating an example of a first common electrode CE1 illustrated in FIG. 2.
Figure 4B:
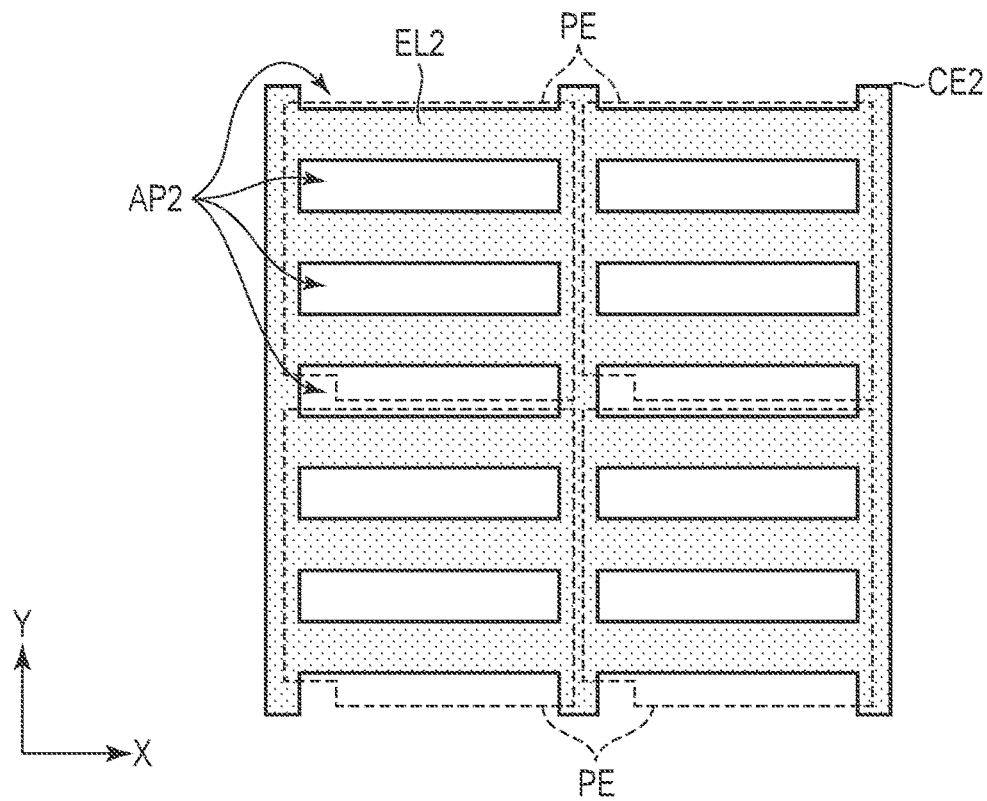
FIG. 4B is a plan view illustrating an example of a second common electrode CE2 illustrated in FIG. 2.

FIGS. 4A and 4B are plan views illustrating examples of the first common electrode CE1 and the second common electrode CE2 illustrated in FIG. 2. Here, four pixel electrodes PE arranged two by two in each of the first direction X and the second direction Y are indicated by dotted lines.

As illustrated in FIG. 4A, the first common electrode CE1 includes three first openings AP1 overlapping one pixel electrode PE. Each of the plurality of first openings AP1 extends in the first direction X and is arranged in the second direction Y. The plurality of first openings AP1 may be arranged in the first direction X and extend in the second direction Y. A shape of the first opening AP1 is not limited to a rectangle of the example illustrated in FIG. 4A, and may be other shapes such as a square, a circle, and an ellipse. The first common electrode CE1 may include the plurality of first openings AP1 arranged in the first direction X and the second direction Y in a region overlapping one pixel electrode PE. The first electrode portion EL1 defines the first opening AP1, and overlaps each pixel electrode PE. A part of the first electrode portions EL1 overlaps over the pixel electrodes PE adjacent in the first direction X and the second direction Y.

As illustrated in FIG. 4B, the second common electrode CE2 includes four second openings AP2 overlapping one pixel electrode PE. A part of the second openings AP2 overlaps over the pixel electrodes PE adjacent in the second direction Y. The second opening AP2 is formed in a region overlapping the first electrode portion EL1. Each of the plurality of second openings AP2 extends in the first direction X and is arranged in the second direction Y. Similarly to the first opening AP1, a layout and a shape of the second opening AP2 are not limited to the illustrated example. The second electrode portion EL2 defines the second opening AP2 and overlaps each pixel electrode PE. The second electrode portion EL2 is formed in a region overlapping at least the first opening AP1. In other words, a shape of the second electrode portion EL2 may be appropriately deformed in accordance with the shape of the first opening AP1.

FIG. 5 is a plan view illustrating a state in which the first common electrode CE1 and the second common electrode CE2 illustrated in FIGS. 4A and 4B overlap.

The first common electrode CE1 is indicated by a dot pattern, and the second common electrode CE2 is indicated by oblique lines. Each of the pixel electrodes PE overlaps the first electrode portion EL1, and overlaps the second electrode portion EL2 in the first opening AP1. In plan view, it is desirable that there is no gap between the first electrode portion EL1 and the second electrode portion EL2.

Figure 6:
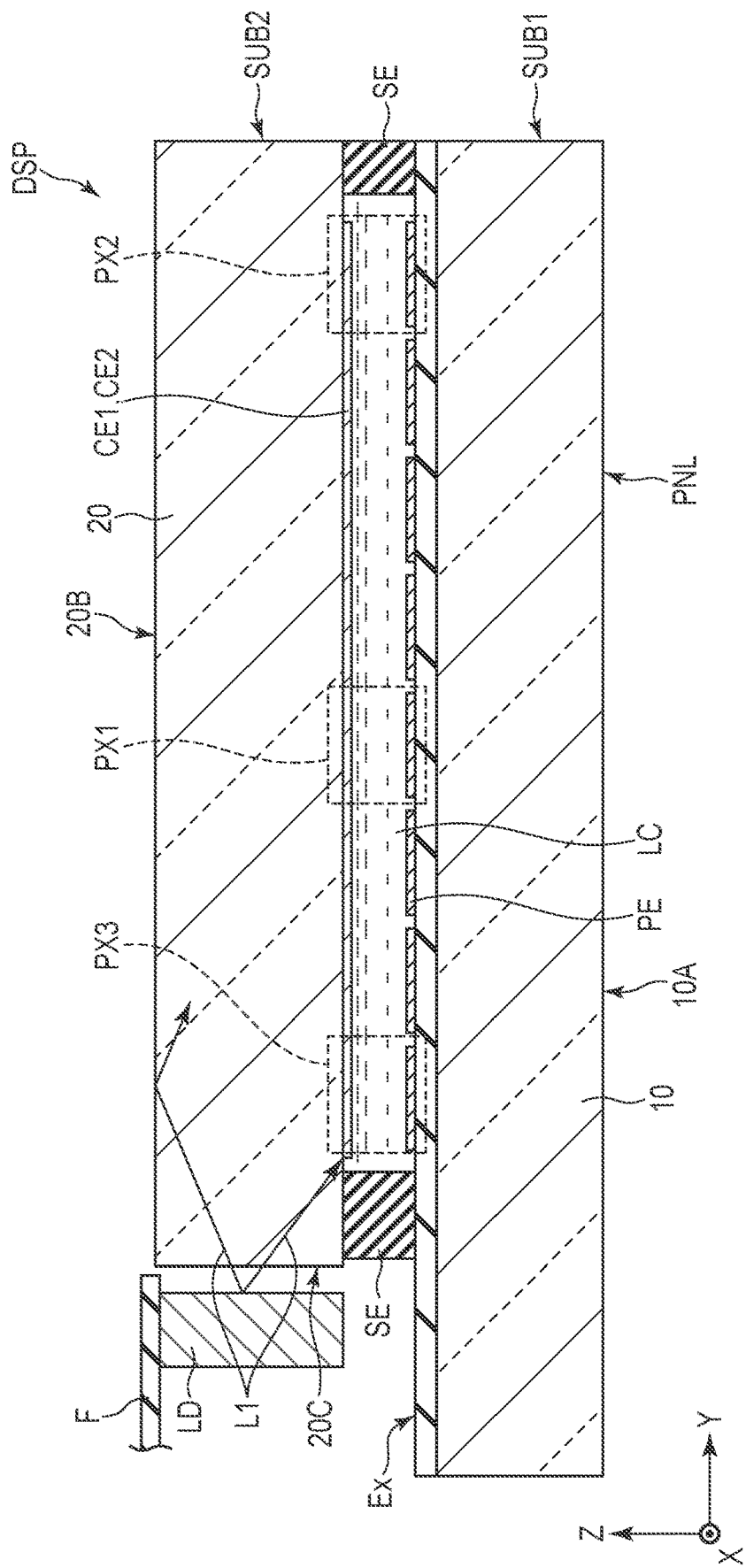
FIG. 6 is a cross-sectional view illustrating an example of the display device DSP of the present embodiment.

FIG. 6 is a cross-sectional view illustrating an example of the display device DSP of the present embodiment. Only main parts are illustrated in the display panel PNL, and the first common electrode CE1 and the second common electrode CE2 are illustrated in a simplified manner.

The second transparent substrate 20 includes a side surface 20C facing the light emitting element LD in the second direction Y. The light emitting element LD is electrically connected to a wiring board F. The light emitting element LD is, for example, a light emitting diode, and includes a red light emitting portion, a green light emitting portion, and a blue light emitting portion although not described in detail.

Next, light L1 emitted from the light emitting element LD will be described with reference to FIG. 6.

The light emitting element LD emits the light L1 toward the side surface 20C. The light L1 emitted from the light emitting element LD travels along a direction of an arrow indicating the second direction Y, and is incident on the second transparent substrate 20 from the side surface 20C. The light L1 incident on the second transparent substrate 20 travels inside the display panel PNL while being repeatedly reflected. The light L1 incident on the liquid crystal layer LC to which the voltage is not applied is transmitted through the liquid crystal layer LC without being almost scattered. The light L1 incident on the liquid crystal layer LC to which the voltage is applied is scattered by the liquid crystal layer LC. The display device DSP can be observed from the main surface 10A side and can also be observed from the main surface 20B side. The display device DSP can observe a background of the display device DSP via the display device DSP even when the background is observed from the main surface 10A side or the main surface 20B side.

In the display panel PNL illustrated in FIG. 6, respective configurations of a pixel PX3 close to the light emitting element LD, a pixel PX1 farther away from the light emitting element LD than the pixel PX3, and a pixel PX2 farther away from the light emitting element LD than the pixel PX1 will be described. For example, the pixel PX1 may be disposed substantially at a center of the display panel PNL.

Figure 7:
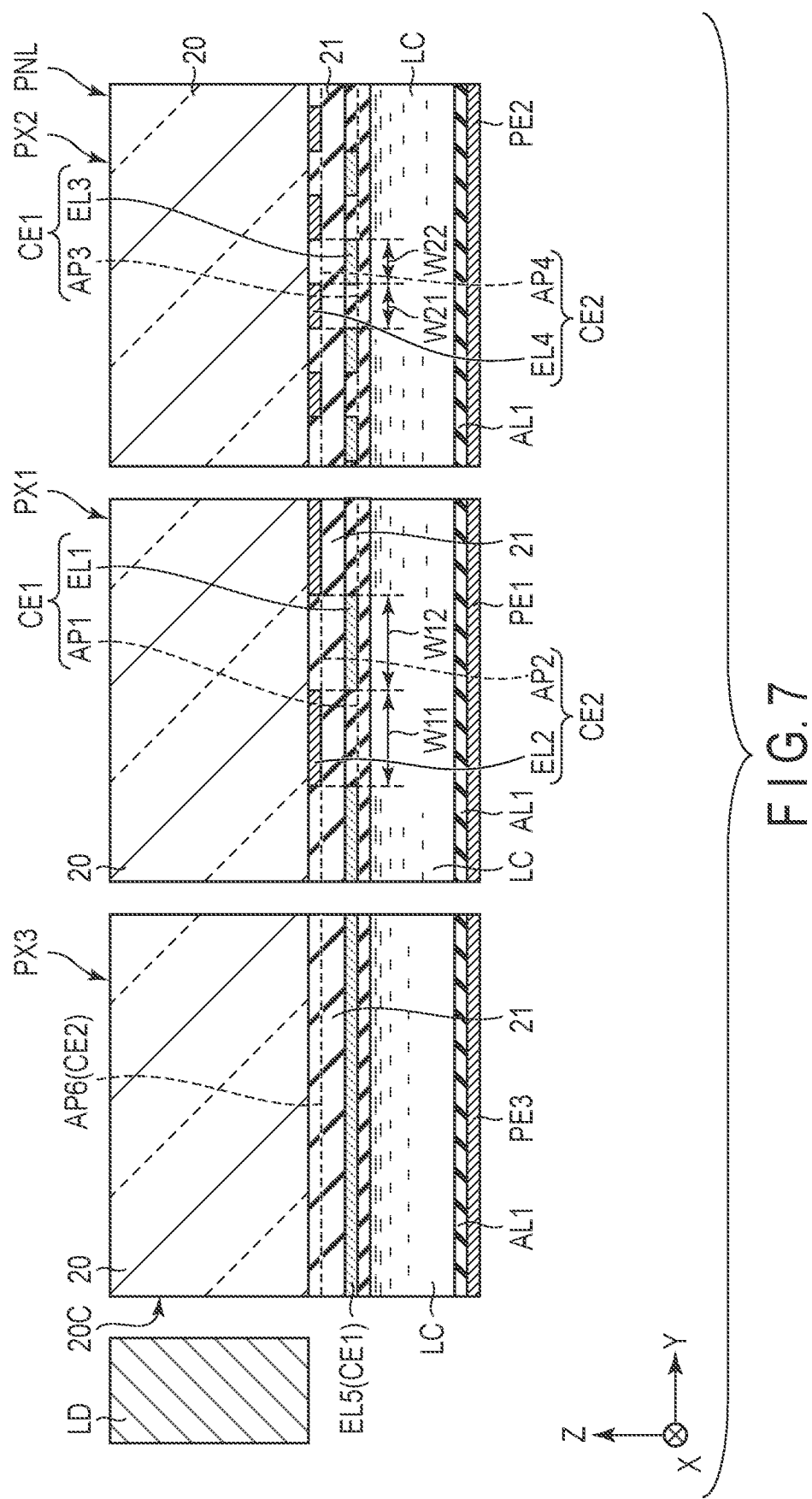
FIG. 7 is a cross-sectional view illustrating an example of pixels PX1 to PX3.

FIG. 7 is a cross-sectional view illustrating an example of the pixels PX1 to PX3. Here, only main parts of the pixels PX1 to PX3 are illustrated.

In the pixel PX1, the first common electrode CE1 includes the first opening AP1 and the first electrode portion EL1. The first opening AP1 has a width W11 along the second direction Y. The first electrode portion EL1 has a width W12 along the second direction Y. The second common electrode CE2 includes the second opening AP2 overlapping the first electrode portion EL1 and the second electrode portion EL2 overlapping the first opening AP1. A width of the second opening AP2 is equal to the width W12, and a width of the second electrode portion EL2 is equal to the width W11. The pixel electrode PE1 overlaps the first electrode portion EL1 and the second electrode portion EL2. The first opening AP1 and the second opening AP2 do not overlap each other in the third direction Z, and the first electrode portion EL1 and the second electrode portion EL2 do not overlap each other. A part of the first opening AP1 and a part of the second opening AP2 may overlap each other, or a part of the first electrode portion EL1 and a part of the second electrode portion EL2 may overlap each other.

In the pixel PX2, the first common electrode CE1 includes a third opening AP3 and a third electrode portion EL3 that defines the third opening AP3. In other words, a region of the first common electrode CE1 of the pixel PX2 that is not the third opening AP3 is defined as the third electrode portion EL3. The third electrode portion EL3 is formed integrally with the first electrode portion EL1, and has the same electric potential as the first electrode portion EL1. The third opening AP3 has a width W21 different from the width W11 along the second direction Y. The third electrode portion EL3 has a width W22 different from the width W12 along the second direction Y.

The second common electrode CE2 includes a fourth opening AP4 and a fourth electrode portion EL4 that defines the fourth opening AP4. In other words, a region of the second common electrode CE2 of the pixel PX2 that is not the fourth opening AP4 is referred to as the fourth electrode portion EL4. The fourth electrode portion EL4 is formed integrally with the second electrode portion EL2 and has the same electric potential as the second electrode portion EL2. The fourth opening AP4 overlaps the third electrode portion EL3, and the fourth electrode portion EL4 overlaps the third opening AP3. A width of the fourth opening AP4 is equal to the width W22, and a width of the fourth electrode portion EL4 is equal to the width W21. The pixel electrode PE2 overlaps the third electrode portion EL3 and the fourth electrode portion EL4.

In the first common electrode CE1, the first opening AP1 is provided between the light emitting element LD and the third opening AP3 along the second direction Y. The width W21 of the third opening AP3 is smaller than the width W11 of the first opening AP1. The first electrode portion EL1 is provided between the light emitting element LD and the third electrode portion EL3 along the second direction Y. The width W22 of the third electrode portion EL3 is smaller than the width W12 of the first electrode portion EL1.

The number of third openings AP3 overlapping the pixel electrode PE2 is larger than the number of first openings AP1 overlapping the pixel electrode PE1. The number of edges of the third electrode portion EL3 that defines the third opening AP3 is larger than the number of edges of the first electrode portion EL1 that defines the first opening AP1. That is, the first common electrode CE1 is more subdivided in the pixel PX2 than in the pixel PX1.

In the pixel PX3, the first common electrode CE1 includes a fifth electrode portion EL5. The fifth electrode portion EL5 is formed integrally with the first electrode portion EL1, and has the same electric potential as the first electrode portion EL1. The first common electrode CE1 may include a fifth opening, but is not illustrated here. The second common electrode CE2 includes a sixth opening AP6 overlapping the fifth electrode portion EL5. It is desirable that the second common electrode CE2 includes a sixth electrode portion overlapping the fifth opening when the first common electrode CE1 includes the fifth opening. The pixel electrode PE3 overlaps the fifth electrode portion EL5. When the second common electrode CE2 includes the sixth electrode portion, the pixel electrode PE3 overlaps the sixth electrode.

Figure 8:
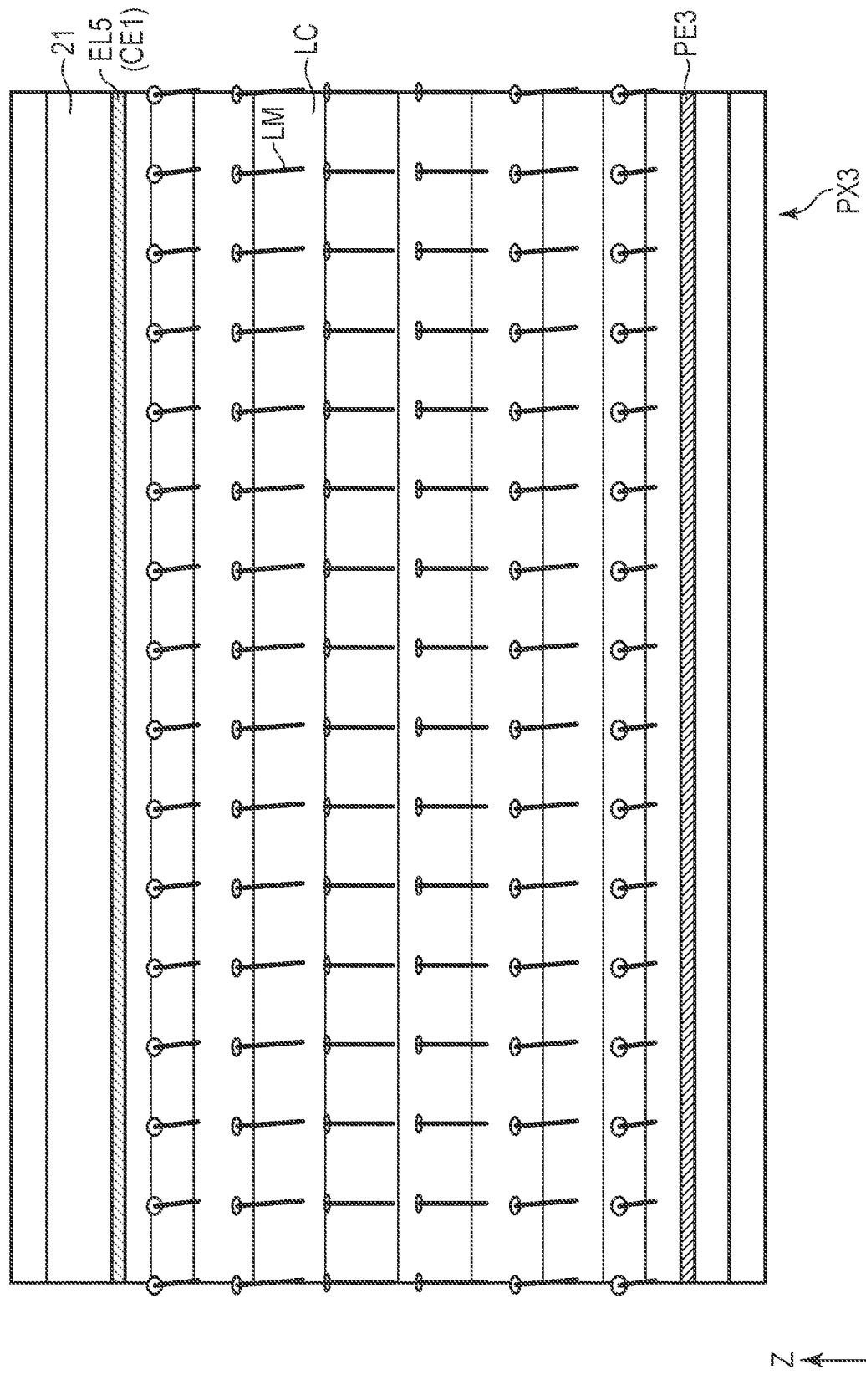
FIG. 8 is a schematic diagram illustrating an electric field distribution and an alignment state of liquid crystal molecules in the pixel PX3.

FIG. 8 is a schematic diagram illustrating an electric field distribution and an alignment state of liquid crystal molecules in the pixel PX3. When a voltage is applied to the pixel PX3, an electric field is formed between the pixel electrode PE3 and the fifth electrode portion EL5 of first common electrode CE1. At this time, each of equi-electric potential surfaces is substantially parallel to the X-Y plane. That is, a line of electric force substantially parallel to the third direction Z is formed between the pixel electrode PE3 and the fifth electrode portion EL5. The liquid crystal molecules LM have positive dielectric anisotropy, and are aligned such that long axes are along the line of electric force. That is, in the liquid crystal layer LC between the pixel electrode PE3 and the fifth electrode portion EL5, substantially all the liquid crystal molecules LM are aligned along the third direction Z.

Figure 9:
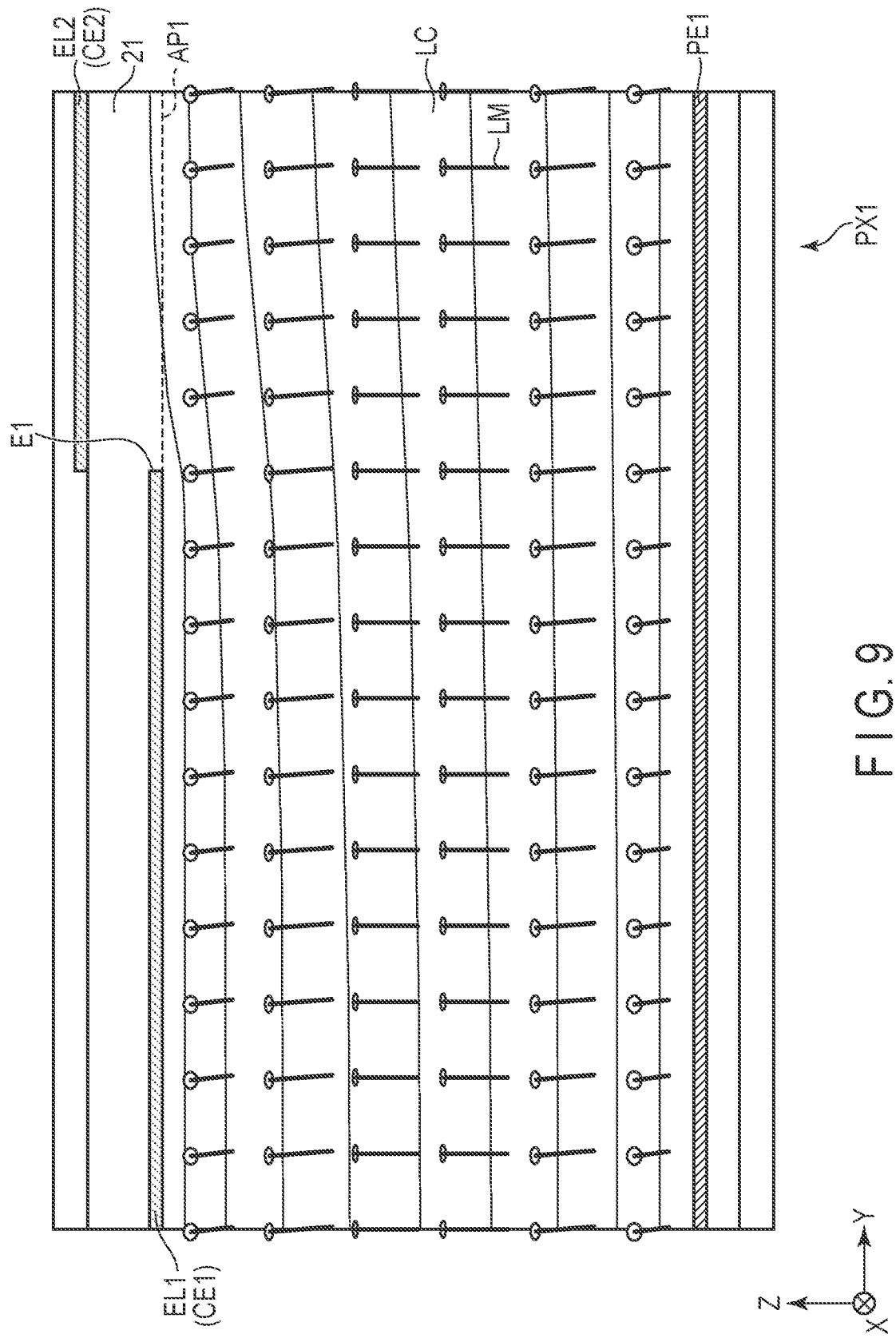
FIG. 9 is a schematic diagram illustrating an electric field distribution and an alignment state of the liquid crystal molecules in the pixel PX1.

FIG. 9 is a schematic diagram illustrating an electric field distribution and an alignment state of the liquid crystal molecules in the pixel PX1. When a voltage is applied to the pixel PX1, electric fields are formed between the pixel electrode PE1 and the first electrode portion EL1 of the first common electrode CE1, and between the pixel electrode PE1 and the second electrode portion EL2 of the second common electrode CE2. At this time, equi-electric potential surfaces between the pixel electrode PE1 and the first electrode portion EL1 are substantially parallel to the X-Y plane. An interval between equi-electric potential surfaces between the pixel electrode PE1 and the second electrode portion EL2 extends in the third direction Z, and a part of the equi-electric potential surfaces is formed beyond the first opening AP1 toward the second electrode portion EL2. Equi-electric potential surfaces are inclined with respect to the X-Y plane in the vicinity of boundaries between the first electrode portion EL1 and the second electrode portion EL2 (or an edge E1 of the first electrode portion EL1).

The liquid crystal molecules LM between the pixel electrode PE1 and the first electrode portion EL1 are aligned along the third direction Z. In the vicinity of the boundaries between the first electrode portion EL1 and the second electrode portion EL2, the liquid crystal molecules LM are obliquely aligned with respect to the third direction Z under the influence of the inclined equi-electric potential surfaces.

Figure 10:
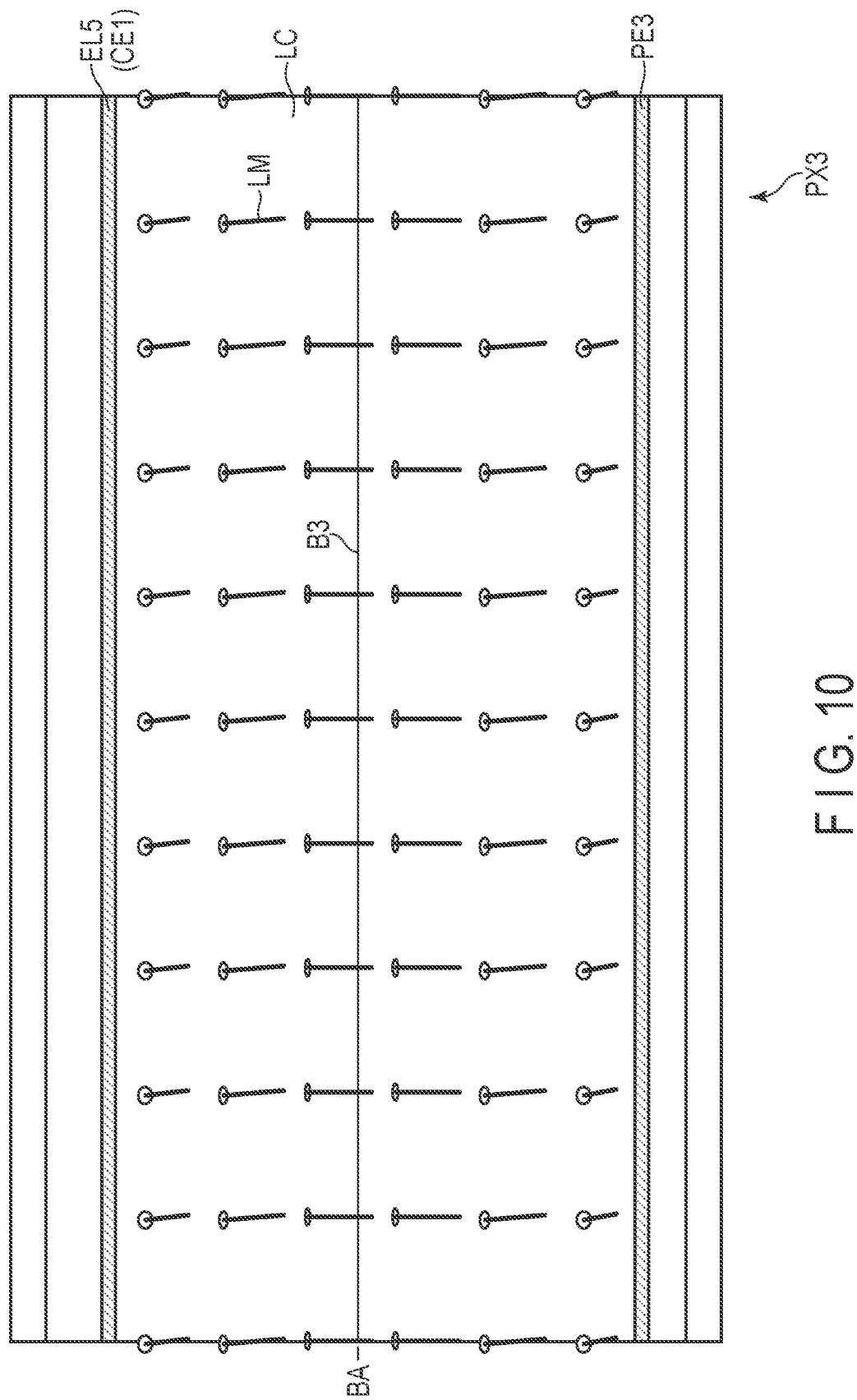
FIG. 10 is a schematic diagram illustrating a luminance distribution and an alignment state of the liquid crystal molecules in the pixel PX3 illustrated in FIG. 8.

FIG. 10 is a schematic diagram illustrating a luminance distribution and an alignment state of the liquid crystal molecules in the pixel PX3 illustrated in FIG. 8. A luminance distribution B3 in the drawing corresponds to a distribution of scattering intensity of light propagated from the light emitting element to the pixel PX3 when a voltage is applied to the pixel PX3. Luminance BA between the pixel electrode PE3 and the fifth electrode portion EL5 is substantially constant regardless of a location.

FIG. 11 is a schematic diagram illustrating a luminance distribution and an alignment state of the liquid crystal molecules in the pixel PX1 illustrated in FIG. 9. A luminance distribution B1 in the drawing corresponds to a distribution of scattering intensity of light propagated from the light emitting element to the pixel PX1 when a voltage is applied to the pixel PX1. Luminance BB higher than the luminance BA of the pixel PX3 is obtained in the vicinity of the boundaries between the first electrode portion EL1 and the second electrode portion EL2. For example, the luminance BB is 1.3 to 1.5 times the luminance BA. Such an increase in the luminance is caused by the liquid crystal molecules LM obliquely aligned with respect to the third direction Z in the vicinity of the boundaries between the first electrode portion EL1 and the second electrode portion EL2.

In a region in which the liquid crystal molecules LM are aligned along the third direction Z between the pixel electrode PE1 and the first electrode portion EL1 and between the pixel electrode PE1 and the second electrode portion EL2, the luminance BA equal to that of the pixel PX3 is obtained.

Accordingly, when light of the same luminance propagates to the pixel PX1 and the pixel PX3, the luminance of the scattered light in the pixel PX1 is larger than the luminance of the scattered light in the pixel PX3.

FIG. 12 is a schematic diagram illustrating an electric field distribution and an alignment state of the liquid crystal molecules in the pixel PX2. When a voltage is applied to the pixel PX2, electric fields are formed between the pixel electrode PE2 and the third electrode portion EL3 of the first common electrode CE1, and between the pixel electrode PE2 and the fourth electrode portion EL4 of the second common electrode CE2. In the vicinity of boundaries between the third electrode portion EL3 and the fourth electrode portion EL4, equi-electric potential surfaces are inclined with respect to the X-Y plane. In the vicinity of the boundaries between the third electrode portion EL3 and the fourth electrode portion EL4, the liquid crystal molecules LM are obliquely aligned with respect to the third direction Z under the influence of the inclined equi-electric potential surfaces. The liquid crystal molecules LM are aligned along the third direction Z between the pixel electrode PE2 and the third electrode portion EL3 and between the pixel electrode PE2 and the fourth electrode portion EL4.

As described with reference to FIG. 7, the number of third openings AP3 in the pixel PX2 is larger than the number of first openings AP1 in the pixel PX1. That is, the number of boundaries between the third electrode portion EL3 and the fourth electrode portion EL4 is larger than the number of boundaries between the first electrode portion EL1 and the second electrode portion EL2. Thus, a region in which the luminance increases in the pixel PX2 is larger than a region in which the luminance increases in the pixel PX1. Accordingly, when light of the same luminance propagates to the pixel PX1 and the pixel PX2, the luminance of the scattered light in the pixel PX2 is larger than the luminance of the scattered light in the pixel PX1.

The display device DSP of the present embodiment is a system in which the light L1 from the light emitting element LD is incident from the side surface 20C of the second substrate SUB2 and propagates through the display panel PNL. Focusing on the luminance distribution in such a display device DSP, the luminance tends to decrease as a distance from the light emitting element LD increases.

The luminance of the light propagated to the pixel PX1 is referred to as first luminance, and the luminance of the light propagated to the pixel PX3 closer to the light emitting element LD than the pixel PX1 is referred to as third luminance. The first luminance is lower than the third luminance. On the other hand, the luminance of the scattered light in the pixel PX1 is larger than the luminance of the scattered light in the pixel PX3. Thus, in the pixel PX1 and the pixel PX3, the amount of light contributing to display can be equalized.

The luminance of the light propagated to the pixel PX2 farther away from the light emitting element LD than the pixel PX1 is referred to as second luminance. The second luminance is lower than the first luminance. On the other hand, the luminance of the scattered light in the pixel PX2 is larger than the luminance of the scattered light in the pixel PX1. Thus, in the pixel PX1 and the pixel PX2, the amount of light contributing to display can be equalized. Accordingly, it is possible to suppress a decrease in display quality due to the decrease in the luminance.

According to the present embodiment, the second common electrode CE2 includes the second opening AP2 overlapping the first electrode portion EL1. Thus, even though the second common electrode CE2 is a transparent electrode having light absorbency, an electrode area can be reduced as compared with the case where the second opening AP2 is not provided, and light absorption can be suppressed.

Second Configuration Example

Figure 13:
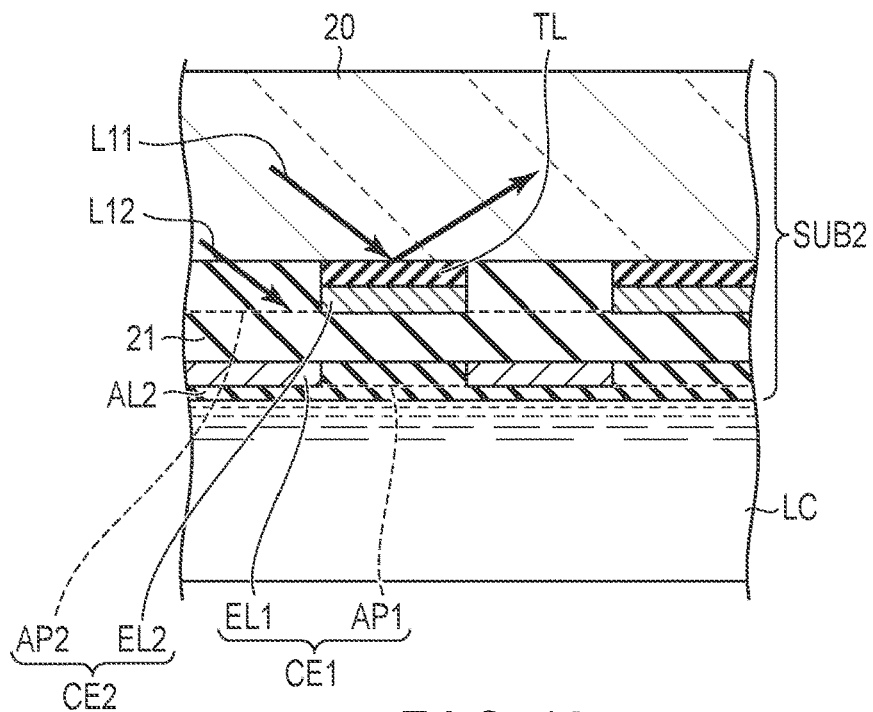
FIG. 13 is a cross-sectional view illustrating a second configuration example.

FIG. 13 is a cross-sectional view illustrating a second configuration example. A second substrate SUB2 of the second configuration example illustrated in FIG. 13 is different from the second substrate SUB2 of the first configuration example illustrated in FIG. 2 in that a transparent layer TL is provided. In FIG. 13, the second substrate SUB2 and the liquid crystal layer LC are illustrated, and the first substrate is not illustrated.

The transparent layer TL is provided between the second electrode portion EL2 and the second transparent substrate 20. The transparent layer TL is in contact with the second transparent substrate 20 and the second electrode portion EL2. Although not illustrated, the same transparent layer TL is also provided between another electrode portion of the second common electrode CE2 and the second transparent substrate 20. Another member may be interposed between the second electrode portion EL2 and the transparent layer TL. The insulating film 21 covers the second electrode portion EL2 and the transparent layer TL.

The transparent layer TL is, for example, an insulating layer made of a transparent organic material such as a siloxane-based resin or a fluorine-based resin. Regarding a refractive index, a refractive index nTL of the transparent layer TL is lower than a refractive index n20 of the second transparent substrate 20. A refractive index n10 of the first transparent substrate 10 is equal to the refractive index n20. For example, the refractive indexes n10 and n20 are about 1.5, and the refractive index nTL is 1.0 or more and 1.5 or less.

Of the light incident on the second transparent substrate 20, light L11 directed to the second electrode portion EL2 is reflected at an interface between the second transparent substrate 20 and the transparent layer TL and does not reach the second electrode portion EL2. Light L12 directed toward the second opening AP2 is transmitted through the insulating film 21 and is incident on the liquid crystal layer LC.

According to such a second configuration example, the same effects as those of the first configuration example are obtained. Even when the light absorbency of the second common electrode CE2 is higher than the light absorbency of the insulating film 21, the absorption of the light L11 by the second common electrode CE2 can be suppressed, and a decrease in utilization efficiency of the light from the light emitting element LD can be suppressed.

Third Configuration Example

Figure 14:
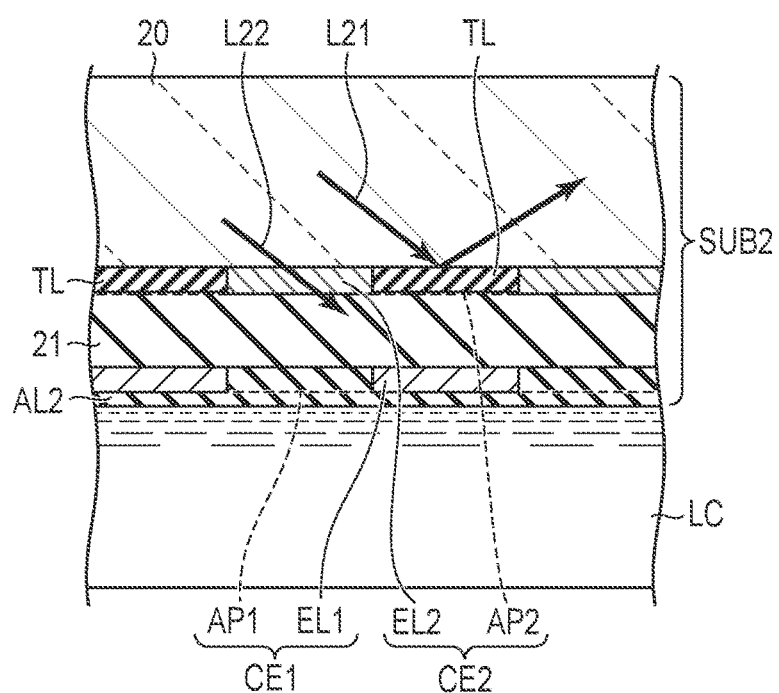
FIG. 14 is a cross-sectional view illustrating a third configuration example.

FIG. 14 is a cross-sectional view illustrating a third configuration example. A second substrate SUB2 of the third configuration example illustrated in FIG. 14 is different from the second substrate SUB2 of the second configuration example illustrated in FIG. 13 in that the transparent layer TL is provided between the insulating film 21 and the second transparent substrate 20 in the second opening AP2. In FIG. 14, the second substrate SUB2 and the liquid crystal layer LC are illustrated, and the first substrate is not illustrated. The transparent layer TL is in contact with the insulating film 21 and the second transparent substrate 20. Although not illustrated, the same transparent layer TL is also provided in other openings of the second common electrode CE2. As a material of the transparent layer TL, the same material as that described in the second configuration example can be applied. A refractive index of the transparent layer TL is lower than a refractive index of the second transparent substrate 20.

Of the light incident on the second transparent substrate 20, light L21 directed to the second opening AP2 is reflected at an interface between the second transparent substrate 20 and the transparent layer TL, and does not reach the insulating film 21 via the second opening AP2. Light L22 directed toward the second electrode portion EL2 is transmitted through the second electrode portion EL2 and is incident on the liquid crystal layer LC.

According to such a third configuration example, the same effects as those of the first configuration example are obtained. Even when the light absorbency of the insulating film 21 is higher than the light absorbency of the second common electrode CE2, the absorption of the light L21 by the insulating film 21 can be suppressed, and a decrease in utilization efficiency of the light from the light emitting element LD can be suppressed.

Fourth Configuration Example

Figure 15:
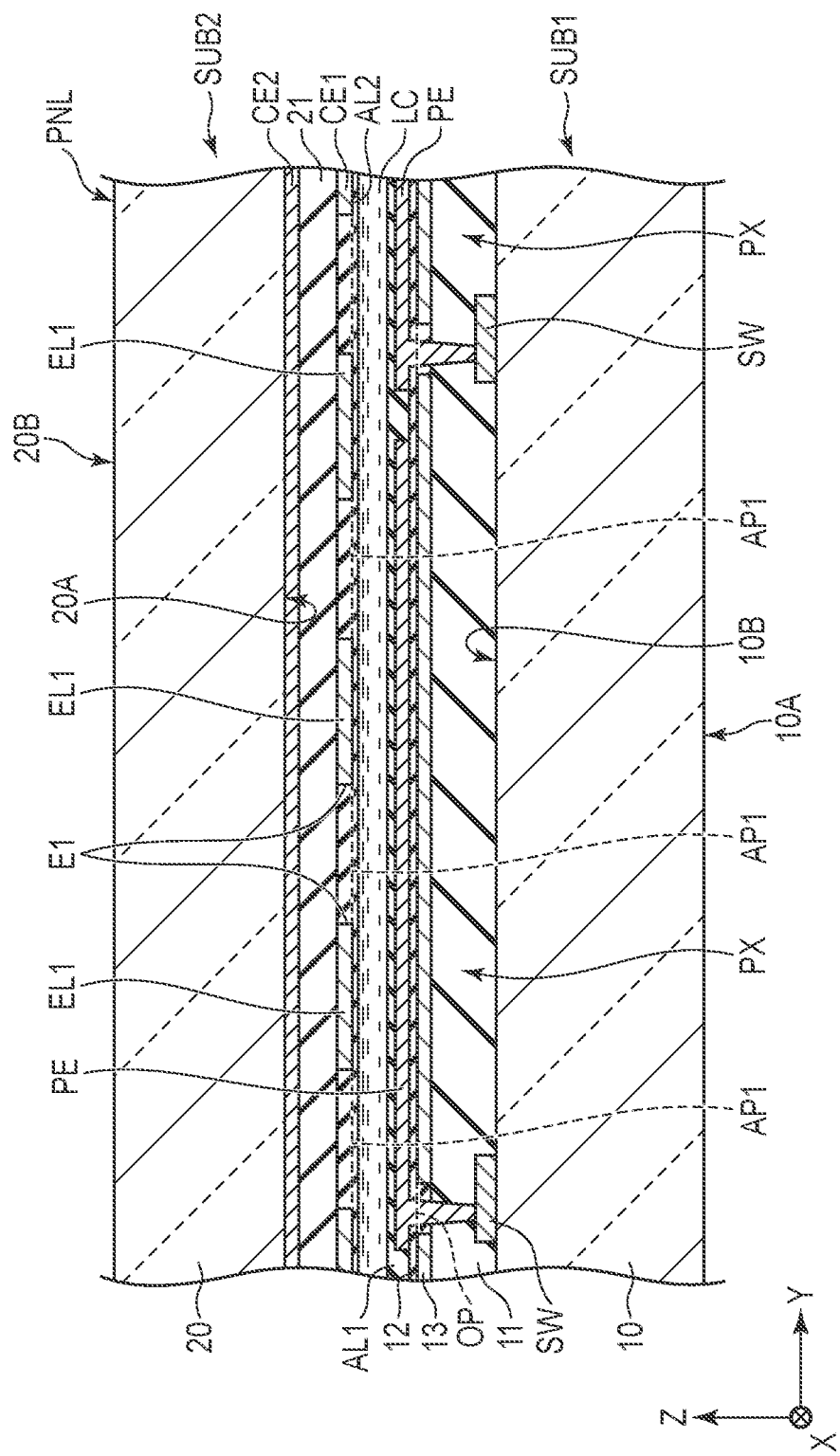
FIG. 15 is a cross-sectional view illustrating a fourth configuration example.

FIG. 15 is a cross-sectional view illustrating a fourth configuration example. A display panel PNL of a fourth configuration example illustrated in FIG. 15 is different from the display panel PNL of the first configuration example illustrated in FIG. 2 in that the second common electrode CE2 does not have the opening. That is, the second common electrode CE2 overlaps the first opening AP1 and the first electrode portion EL1.

Similarly to the first configuration example, in such a fourth configuration example, when a voltage is applied to the pixel PX, the luminance of the scattered light increases in the vicinity of the edge E1 of the first electrode portion EL1. Accordingly, in the fourth configuration example, the same effects as those of the first configuration example are obtained.

[Power Supply Structure]

Figure 16:
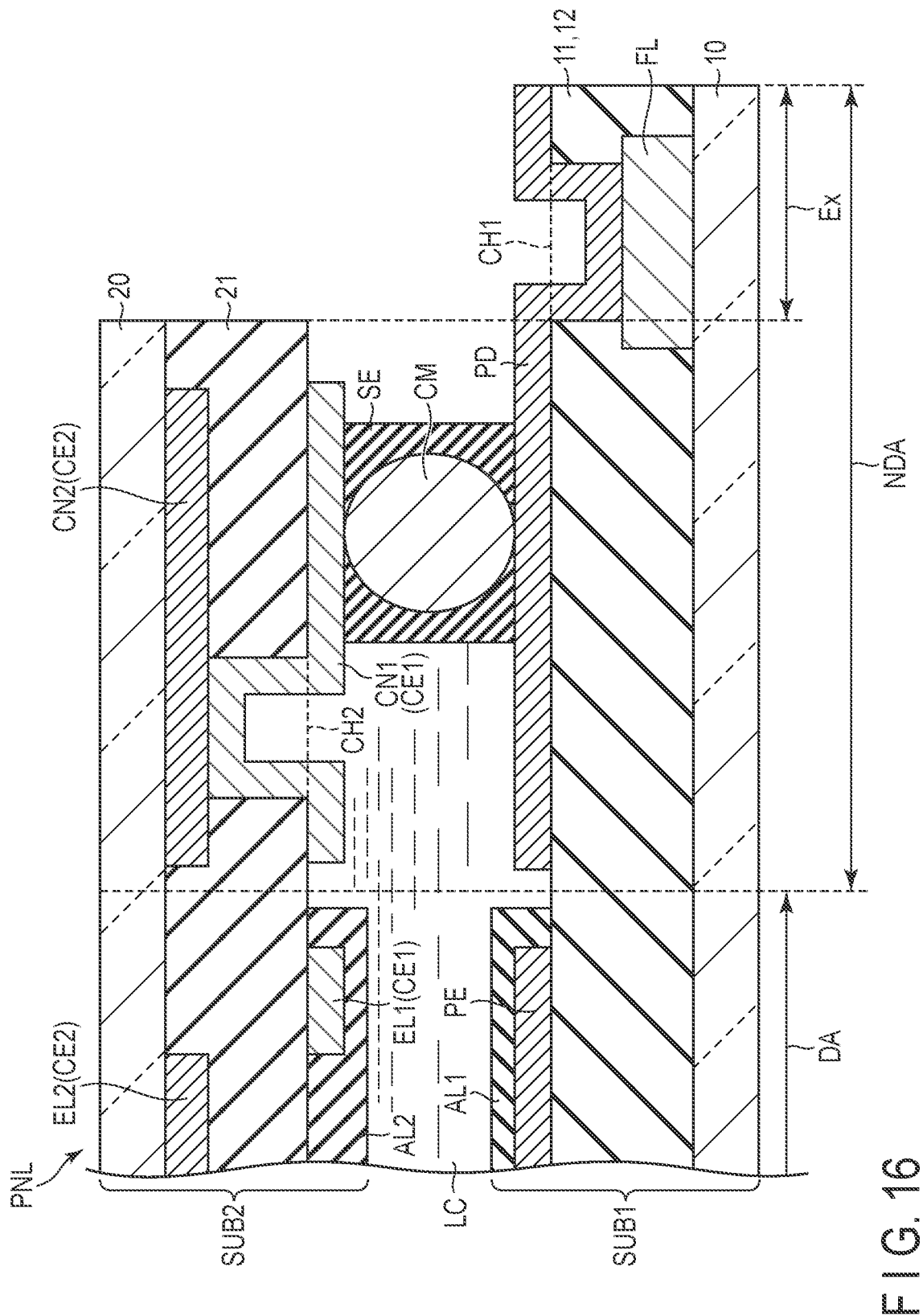
FIG. 16 is a cross-sectional view illustrating a power supply structure for applying a voltage to the first common electrode CE1 and the second common electrode CE2.

FIG. 16 is a cross-sectional view illustrating a power supply structure for applying a voltage to the first common electrode CE1 and the second common electrode CE2.

The first substrate SUB1 includes a power supply line FL that supplies a common voltage (Vcom) and a power supply pad PD electrically connected to the power supply line FL. The power supply line FL is made of, for example, the same material as the scanning line G or the signal line S. The power supply pad PD is made of, for example, the same material as the pixel electrode PE. The power supply line FL and the power supply pad PD are provided in the non-display area NDA. In the example illustrated in FIG. 16, the power supply line FL is provided in the extension portion Ex. The power supply pad PD is in contact with the power supply line FL in a through-hole CH1 penetrating the insulating films 11 and 12. The power supply pad PD is exposed from the alignment film AL1.

In the second substrate SUB2, the first common electrode CE1 includes a first connection portion CN1 overlapping the power supply pad PD. The first connection portion CN1 is integrally formed with each electrode portion such as the first electrode portion EL1. The second common electrode CE2 includes a second connection portion CN2 overlapping with the first connection portion CN1. The second connection portion CN2 is integrally formed with each electrode portion such as the second electrode portion EL2. The first connection portion CN1 is in contact with the second connection portion CN2 in a through-hole CH2 penetrating the insulating film 21. Accordingly, the first connection portion CN1 and the second connection portion CN2 are electrically connected to each other.

A connection member CM is in contact with each of the power supply pad PD and the first connection portion CN1. Accordingly, the power supply pad PD and the first connection portion CN1 are electrically connected to each other. Such a connection member CM is, for example, a conductive particle on which gold plating or the like is performed, and is included in the sealant SE. That is, the power supply pad PD and the first connection portion CN1 are arranged in a region in which the sealant SE is provided, and are electrically connected to each other by the connection member CM when the first substrate SUB1 and the second substrate SUB2 are bonded.

According to such a power supply structure, when the common voltage is supplied to the power supply line FL, the common voltage can be applied to the first common electrode CE1 via the power supply pad PD, the connection member CM, and the first connection portion CN1, and the same common voltage can also be applied to the second common electrode CE2 via the second connection portion CN2.

Fifth Configuration Example

Figure 17:
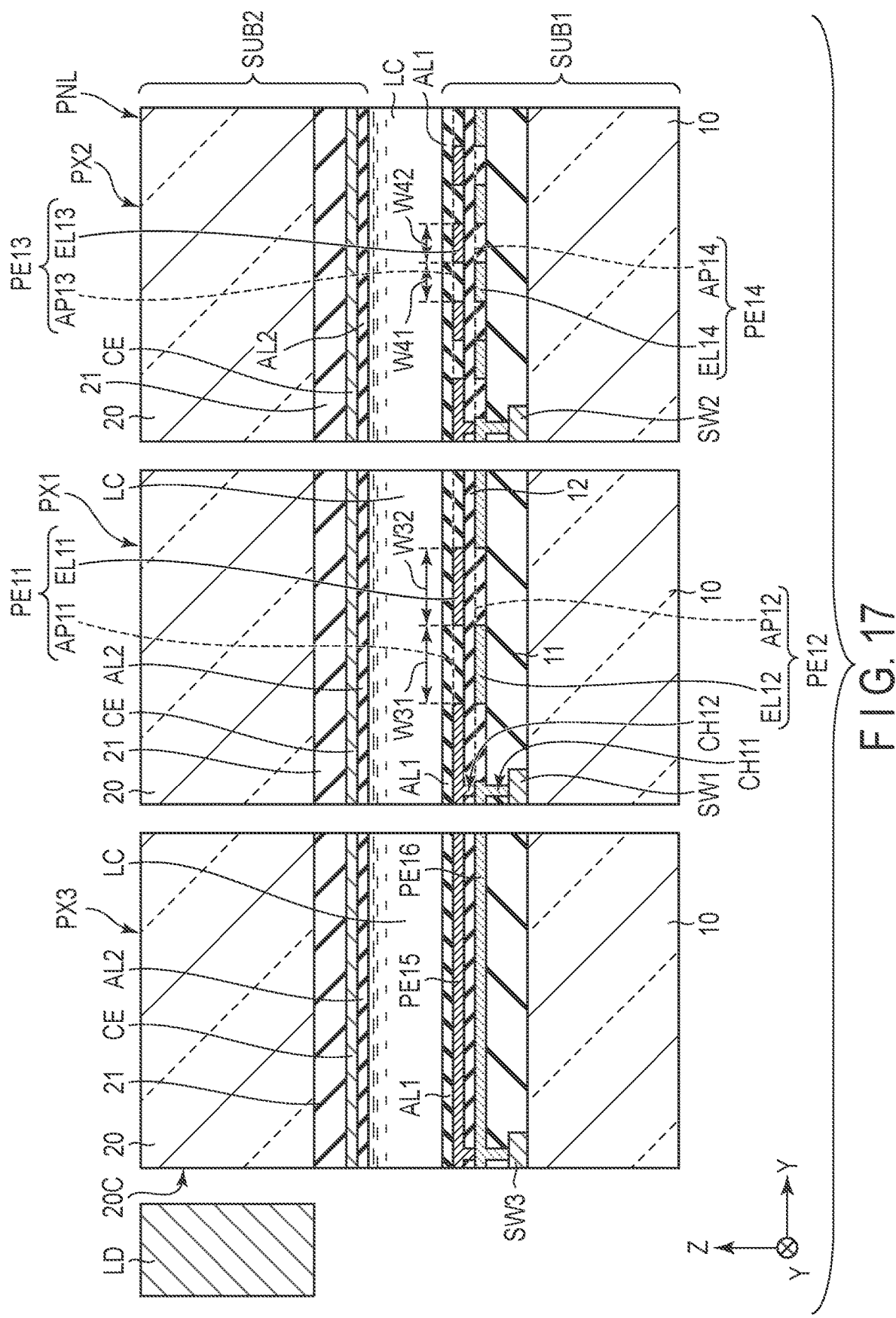
FIG. 17 is a cross-sectional view illustrating a fifth configuration example.

FIG. 17 is a cross-sectional view illustrating a fifth configuration example. A display panel PNL of the fifth configuration example illustrated in FIG. 17 is different from the display panel PNL of the first configuration example illustrated in FIG. 7 in that pixel electrodes are formed in two layers. The common electrode CE is a single layer, and is provided between the alignment film AL2 and the insulating film 21 in the example illustrated in FIG. 17. However, in the fifth configuration example, the first common electrode CE1 and the second common electrode CE2 may also be provided as illustrated in FIG. 7.

A pixel PX1 includes a switching element SW1, and a first pixel electrode PE11 and a second pixel electrode PE12 electrically connected to the switching element SW1. The first pixel electrode PE11 is provided between the insulating film 12 and the liquid crystal layer LC, and is covered with the alignment film AL1. The second pixel electrode PE12 is provided between the first transparent substrate 10 and the insulating film 12. The second pixel electrode PE12 is electrically connected to the switching element SW1 in a through-hole CH11 of the insulating film 11. The first pixel electrode PE11 is in contact with the second pixel electrode PE12 in a through-hole CH12 of the insulating film 12. Thus, the first pixel electrode PE11 and the second pixel electrode PE12 have the same electric potential.

Similarly in the pixel PX2, a third pixel electrode PE13 is provided between the insulating film 12 and the liquid crystal layer LC, and a fourth pixel electrode PE14 is provided between the first transparent substrate 10 and the insulating film 12. The third pixel electrode PE13 and the fourth pixel electrode PE14 are electrically connected to the switching element SW2 and have the same electric potential.

Similarly in the pixel PX3, a fifth pixel electrode PE15 is provided between the insulating film 12 and the liquid crystal layer LC, and a sixth pixel electrode PE16 is provided between the first transparent substrate 10 and the insulating film 12. The fifth pixel electrode PE15 and the sixth pixel electrode PE16 are electrically connected to the switching element SW3 and have the same electric potential.

In the pixel PX1, the first pixel electrode PE11 includes a first opening AP11 and a first electrode portion EL11 that defines the first opening AP11. The first opening AP11 has a width W31 along the second direction Y. The first electrode portion EL11 has a width W32 along the second direction Y. The second pixel electrode PE12 includes a second opening AP12 and a second electrode portion EL12 that defines the second opening AP12. The second opening AP12 overlaps the first electrode portion EL11, and the second electrode portion EL12 overlaps the first opening AP11. A width of the second opening AP12 is equal to a width W32, and a width of the second electrode portion EL12 is equal to a width W31. The common electrode CE overlaps the first electrode portion EL11 and the second electrode portion EL12.

In the pixel PX2, the third pixel electrode PE13 includes a third opening AP13 and a third electrode portion EL13 that defines the third opening AP13. The third opening AP13 has a width W41 different from the width W31 along the second direction Y. The third electrode portion EL13 has a width W42 different from the width W32 along the second direction Y.

The fourth pixel electrode PE14 includes a fourth opening AP14 and a fourth electrode portion EL14 that defines the fourth opening AP14. The fourth opening AP14 overlaps the third electrode portion EL13, and the fourth electrode portion EL14 overlaps the third opening AP13. A width of the fourth opening AP14 is equal to the width W42, and a width of the fourth electrode portion EL14 is equal to the width W41. The common electrode CE overlaps the third electrode portion EL13 and the fourth electrode portion EL14.

The first pixel electrode PE11 is provided between the light emitting element LD and the third pixel electrode PE13 along the second direction Y. The first opening AP11 is provided between the light emitting element LD and the third opening AP13 along the second direction Y. The width W41 of the third opening AP13 is smaller than the width W31 of the first opening AP11. The first electrode portion EL11 is provided between the light emitting element LD and the third electrode portion EL13 along the second direction Y. The width W42 of the third electrode portion EL13 is smaller than the width W32 of the first electrode portion EL11.

The number of third openings AP13 in the third pixel electrode PE13 is larger than the number of first openings AP11 in the first pixel electrode PE11. The number of edges of the third electrode portion EL13 that defines the third opening AP13 is larger than the number of edges of the first electrode portion EL11 that defines the first opening AP11. That is, the third pixel electrode PE13 is more subdivided than the first pixel electrode PE11.

In such a fifth configuration example, the same effects as those of the above-described first configuration example are also obtained.

[Power Supply Structure]

Figure 18:
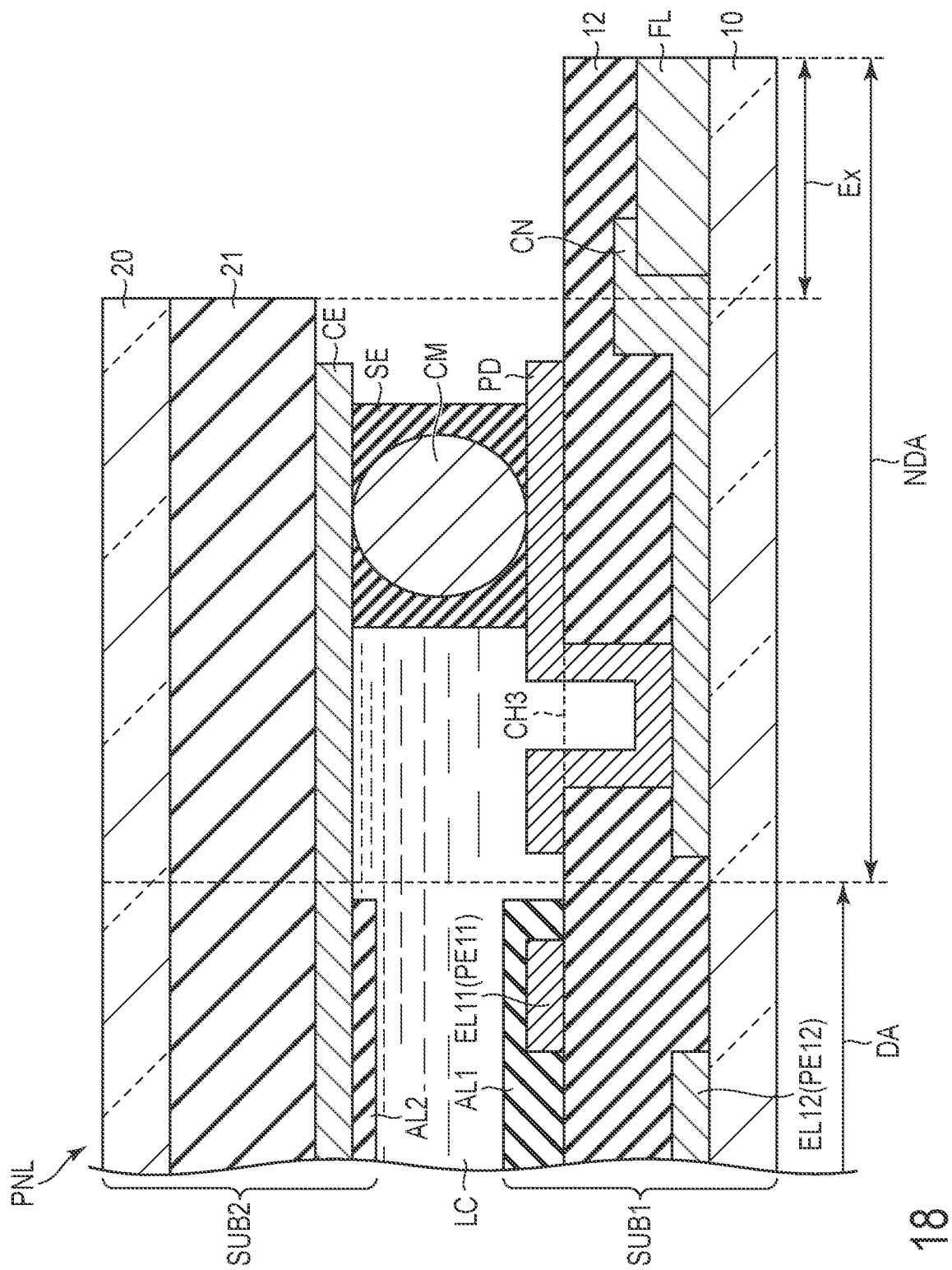
FIG. 18 is a cross-sectional view illustrating a power supply structure for applying a voltage to the common electrode CE illustrated in FIG. 17.

FIG. 18 is a cross-sectional view illustrating a power supply structure for applying a voltage to the common electrode CE illustrated in FIG. 17.

The first substrate SUB1 includes the power supply line FL that supplies the common voltage (Vcom), a connection portion CN electrically connected to the power supply line FL, and the power supply pad PD electrically connected to the connection portion CN. The power supply line FL is made of, for example, the same material as the scanning line G or the signal line S. The connection portion CN is made of, for example, the same material as the second pixel electrode PE12, but is electrically insulated from the second pixel electrode PE12. The power supply pad PD is made of, for example, the same material as the first pixel electrode PE11, but is electrically insulated from the first pixel electrode PE11. The power supply line FL, the connection portion CN, and the power supply pad PD are provided in the non-display area NDA. The connection portion CN is in contact with the power supply line FL, and the power supply pad PD is in contact with the connection portion CN in a through-hole CH3 penetrating the insulating film 12. The power supply pad PD is exposed from the alignment film AL1.

The common electrode CE overlaps the power supply pad PD in the non-display area NDA. The connection member CM included in the sealant SE is in contact with each of the power supply pad PD and the common electrode CE. Accordingly, the power supply pad PD and the common electrode CE are electrically connected to each other.

According to such a power supply structure, when the common voltage is supplied to the power supply line FL, the common voltage can be applied to the common electrode CE via the connection portion CN, the power supply pad PD, and the connection member CM.

In the present embodiment, in the above-described first configuration example, the second transparent substrate 20 corresponds to a transparent substrate, the first common electrode CE1 corresponds to a first transparent electrode, and the second common electrode CE2 corresponds to a second transparent electrode. In the fifth configuration example, the first transparent substrate 10 corresponds to a transparent substrate, the first pixel electrode PE11 corresponds to a first transparent electrode, and the second pixel electrode PE12 corresponds to a second transparent electrode.

As described above, according to the present embodiment, it is possible to provide a display device capable of suppressing deterioration in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device obtained from the configurations disclosed in the specification will be appended below.

(1) A display device including:
a first substrate including a first transparent substrate, a switching element, and a pixel electrode electrically connected to the switching element;
a second substrate including a second transparent substrate, a first common electrode, a second common electrode having the same electric potential as the first common electrode, and an insulating film disposed between the first common electrode and the second common electrode; and
a liquid crystal layer that is disposed between the first substrate and the second substrate, and contains polymers and liquid crystal molecules,
wherein the first common electrode is disposed between the liquid crystal layer and the insulating film, and includes a first opening and a first electrode portion, and
the second common electrode is disposed between the insulating film and the second transparent substrate, and includes a second electrode portion overlapping the first opening.

(2) The display device according to (1), wherein the second common electrode includes a second opening overlapping the first electrode portion.

(3) The display device according to any one of (1) and (2), wherein the first common electrode includes a third opening and a third electrode portion,
the second common electrode includes a fourth electrode portion overlapping the third opening, and a width of the third opening is different from a width of the first opening.

(4) The display device according to (3), wherein the second common electrode includes a fourth opening overlapping the third electrode portion.

(5) The display device according to any one of (3) and (4), further including a light emitting element,
wherein the second transparent substrate includes a side surface facing the light emitting element,
the first opening is disposed between the light emitting element and the third opening, and
the width of the third opening is smaller than the width of the first opening.

(6) The display device according to any one of (1) to (5), wherein the second substrate includes a transparent layer disposed between the second electrode portion and the second transparent substrate, and
the transparent layer is in contact with the second transparent substrate, and has a refractive index lower than the second transparent substrate.

(7) The display device according to (2),
wherein the second substrate includes a transparent layer disposed between the insulating film and the second transparent substrate in the second opening, and
the transparent layer is in contact with the second transparent substrate, and has a refractive index lower than the second transparent substrate.

(8) The display device according to any one of (1) to (7), further including a connection member,
wherein the first substrate includes a power supply pad,
the first common electrode includes a first connection portion overlapping the power supply pad,
the second common electrode includes a second connection portion overlapping the first connection portion,
the first connection portion is in contact with the second connection portion in a through-hole of the insulating film, and
the connection member electrically connects the power supply pad and the first connection portion.

(9) The display device according to (8), further including a sealant that bonds the first substrate and the second substrate,
wherein the connection member is included in the sealant.

(10) A display device including:
a first substrate including a first transparent substrate, a switching element, a first pixel electrode and a second pixel electrode electrically connected to the switching element, and an insulating film disposed between the first pixel electrode and the second pixel electrode;
a second substrate including a second transparent substrate, and a common electrode; and
a liquid crystal layer that is disposed between the first substrate and the second substrate, and contains polymers and liquid crystal molecules,
wherein the first pixel electrode is disposed between the insulating film and the liquid crystal layer, and includes a first opening and a first electrode portion, and
the second pixel electrode is disposed between the first transparent substrate and the insulating film, and includes a second electrode portion overlapping the first opening.

(11) The display device according to (10), wherein the second pixel electrode includes a second opening overlapping the first electrode portion.

(12) The display device according to any one of (10) and (11),
wherein the first substrate includes a third pixel electrode disposed between the insulating film and the liquid crystal layer, and a fourth pixel electrode that is disposed between the first transparent substrate and the insulating film and has the same electric potential as the third pixel electrode, the third pixel electrode includes a third opening and a third electrode portion, the fourth pixel electrode includes a fourth electrode portion overlapping the third opening, and a width of the third opening is different from a width of the first opening.

(13) The display device according to (12), wherein the fourth pixel electrode includes a fourth opening overlapping the third electrode portion.

(14) The display device according to any one of (12) and (13), further including a light emitting element, wherein the second transparent substrate includes a side surface facing the light emitting element, the first opening is disposed between the light emitting element and the third opening, and the width of the third opening is smaller than the width of the first opening.

(15) The display device according to any one of (10) to (14), wherein the second pixel electrode is in contact with the first pixel electrode in a through-hole of the insulating film.

(16) A display device including:

a first substrate;

a second substrate;

a liquid crystal layer that is disposed between the first substrate and the second substrate, and contains polymers and liquid crystal molecules; and a light emitting element facing a side surface of the second substrate, wherein the first substrate or the second substrate includes a transparent substrate, a first transparent electrode, a second transparent electrode having the same electric potential as the first transparent electrode, and an insulating film disposed between the first transparent electrode and the second transparent electrode, each of the first transparent electrode and the second transparent electrode includes a plurality of openings, the openings of the first transparent electrode and the openings of the second transparent electrode do not overlap each other, and the first transparent electrode includes a first opening and a third opening, and the first opening is disposed between the light emitting element and the third opening, and has a width larger than the third opening.

What is claimed is:

1. A display device comprising:
a first substrate including a first transparent substrate, a switching element, and a pixel electrode electrically connected to the switching element;
a second substrate including a second transparent substrate, a first common electrode, a second common electrode having the same electric potential as the first common electrode, and an insulating film disposed between the first common electrode and the second common electrode; and
a liquid crystal layer that is disposed between the first substrate and the second substrate, and contains polymers and liquid crystal molecules,
wherein the first common electrode is disposed between the liquid crystal layer and the insulating film, and includes a first opening and a first electrode portion, and the second common electrode is disposed between the insulating film and the second transparent substrate, and includes a second electrode portion overlapping the first opening.

2. The display device according to claim 1, wherein the second common electrode includes a second opening overlapping the first electrode portion.

3. The display device according to claim 2, wherein the pixel electrode overlaps the first opening and the second opening.

4. The display device according to claim 2,
wherein a width of the first opening is equal to a width of the second electrode portion, and
a width of the second opening is equal to a width of the first electrode portion.

5. The display device according to claim 2,
wherein the second substrate includes a transparent layer disposed between the insulating film and the second transparent substrate in the second opening, and
the transparent layer is in contact with the second transparent substrate, and has a refractive index lower than the second transparent substrate.

6. The display device according to claim 1,
wherein the first common electrode includes a third opening and a third electrode portion,
the second common electrode includes a fourth electrode portion overlapping the third opening, and
a width of the third opening is different from a width of the first opening.

7. The display device according to claim 6, wherein the second common electrode includes a fourth opening overlapping the third electrode portion.

8. The display device according to claim 6, further comprising a light emitting element,
wherein the second transparent substrate includes a side surface facing the light emitting element,
the first opening is disposed between the light emitting element and the third opening, and
the width of the third opening is smaller than the width of the first opening.

9. The display device according to claim 1,
wherein the second substrate includes a transparent layer disposed between the second electrode portion and the second transparent substrate, and
the transparent layer is in contact with the second transparent substrate, and has a refractive index lower than the second transparent substrate.

10. The display device according to claim 1, further comprising a connection member,
wherein the first substrate includes a power supply pad,
the first common electrode includes a first connection portion overlapping the power supply pad,
the second common electrode includes a second connection portion overlapping the first connection portion,
the first connection portion is in contact with the second connection portion in a through-hole of the insulating film, and
the connection member electrically connects the power supply pad and the first connection portion.

11. The display device according to claim 10, further comprising a sealant that bonds the first substrate and the second substrate,
wherein the connection member is included in the sealant.

12. A display device comprising:
a first substrate;
a second substrate;

a liquid crystal layer that is disposed between the first substrate and the second substrate, and contains polymers and liquid crystal molecules; and a light emitting element facing a side surface of the second substrate, wherein the first substrate or the second substrate includes a transparent substrate, a first transparent electrode, a second transparent electrode having the same electric potential as the first transparent electrode, and an insulating film disposed between the first transparent electrode and the second transparent electrode, each of the first transparent electrode and the second transparent electrode includes a plurality of openings, the openings of the first transparent electrode and the openings of the second transparent electrode do not overlap each other, the first transparent electrode includes a first opening and a third opening, and the first opening is disposed between the light emitting element and the third opening, and has a width larger than the third opening.

13. The display device according to claim 12, wherein the first transparent electrode includes a first electrode portion, the second transparent electrode includes a second electrode portion overlapping the first opening, and a second opening overlapping the first electrode portion, a width of the first opening is equal to a width of the second electrode portion, and a width of the second opening is equal to a width of the first electrode portion.

14. The display device according to claim 12, wherein the second transparent electrode includes a second electrode portion overlapping the first opening and a fourth electrode portion overlapping the third opening, and a width of the second electrode portion is larger than a width of the fourth electrode portion.

* * * * *